(12) United States Patent
Isaji et al.

(10) Patent No.: US 12,407,071 B2
(45) Date of Patent: Sep. 2, 2025

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Isaji, Mie (JP); Hitoshi Takeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 507 days.

(21) Appl. No.: 17/922,855

(22) PCT Filed: Apr. 27, 2021

(86) PCT No.: PCT/JP2021/016778
§ 371 (c)(1),
(2) Date: Nov. 2, 2022

(87) PCT Pub. No.: WO2021/235198
PCT Pub. Date: Nov. 25, 2021

(65) Prior Publication Data
US 2023/0268618 A1    Aug. 24, 2023

(30) Foreign Application Priority Data

May 18, 2020    (JP) .................. 2020-086464

(51) Int. Cl.
H01M 50/507    (2021.01)
H01M 50/204    (2021.01)
H01R 25/16    (2006.01)

(52) U.S. Cl.
CPC ....... H01M 50/507 (2021.01); H01M 50/204 (2021.01); H01R 25/161 (2013.01)

(58) Field of Classification Search
CPC ............................. H01M 50/507; H01R 9/223
See application file for complete search history.

(56) References Cited

U.S. PATENT DOCUMENTS

2011/0097620 A1*  4/2011  Kim .................. H01M 10/4207
                                              174/68.2
2016/0211499 A1*  7/2016  Cho .................... H01M 50/264
2017/0025663 A1*  1/2017  Kim .................... H01R 13/5202

FOREIGN PATENT DOCUMENTS

CN    202076428    12/2011
JP    36-011642    5/1961
(Continued)

OTHER PUBLICATIONS

International Search Report issued in International Bureau of WIPO Patent Application No. PCT/JP2021/016778, dated Jul. 13, 2021, along with an English translation thereof.

*Primary Examiner* — Maria Laios
(74) *Attorney, Agent, or Firm* — Greenblum & Bernstein, P.L.C.

(57) ABSTRACT

A connection module is configured to be accommodated inside a battery pack including an upper case and a lower case, the connection module including: a plurality of bus bars that electrically connect a device disposed on the upper case side inside the battery pack to a connector disposed on the lower case side inside the battery pack; a plurality of holders that hold the plurality of bus bars, each of the plurality of holders including bus bar holding portions; and (Continued)

a bracket capable of locking the plurality of holders, wherein, in a state in which the plurality of holders that hold the plurality of bus bars are locked to the bracket, the plurality of bus bars are arranged side by side in a left-right direction orthogonal to a vertical direction, a direction orthogonal to the vertical direction and intersecting the left-right direction is assumed to be a front-rear direction.

8 Claims, 21 Drawing Sheets

(56) References Cited

FOREIGN PATENT DOCUMENTS

| | | |
|---|---|---|
| JP | 06-026165 | 4/1994 |
| JP | 2008-147082 | 6/2008 |
| JP | 2019-186043 | 10/2019 |

* cited by examiner

FIG. 17
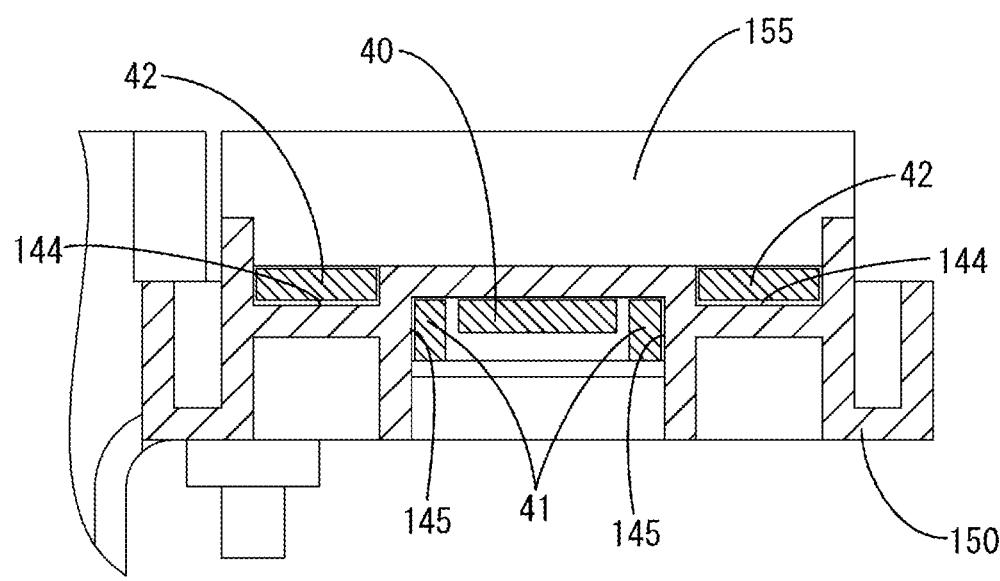
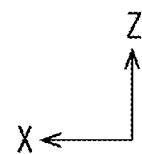

CONNECTION MODULE

TECHNICAL FIELD

The present disclosure relates to a connection module.

BACKGROUND ART

Some conventional casings such as an automobile battery pack are composed of an upper case and a lower case. A manufacturing process of such a battery pack or the like includes a step of electrically connecting devices mounted inside the casing, and a step of placing the upper case on the lower case so as to seal a gap therebetween. Designing of the casing may require connecting the devices disposed on the upper case side inside the casing to a connector for external output. In such a case, it is conceivable to provide the connector for external output on the upper case side as in the assembled battery described in JP 2019-186043A (Patent Document 1 below).

CITATION LIST

Patent Document

Patent Document 1: JP 2019-186043A

SUMMARY OF INVENTION

Technical Problem

However, with the configuration as described above, the manufacturing process of the battery pack or the like cannot be completed even after finishing the step of sealing the gap between the upper case and the lower case after finishing the step of connecting all the devices inside the case (corresponding to a casing in the present application). The reason for this is that connection of the connector for external output needs to be performed separately after performing the step of sealing the gap between the upper case and the lower case. This may complicate the manufacturing process of the battery pack or the like.

The present disclosure has been completed in light of the above-described circumstances, and an object thereof is to provide a connection module that allows a device disposed on the upper case side and a connector disposed on the lower case side inside a casing to be electrically connected to each other, and that can be easily attached.

Solution to Problem

A connection module according to the present disclosure is a connection module configured to be accommodated inside a casing including an upper case and a lower case, the connection module including: a plurality of bus bars that electrically connect a device disposed on the upper case side inside the casing to a connector disposed on the lower case side inside the casing; a plurality of holders that hold the plurality of bus bars, each of the plurality of holders including a bus bar holding portion; and a bracket capable of locking the plurality of holders, wherein, in a state in which the plurality of holders that hold the plurality of bus bars are locked to the bracket, the plurality of bus bars are arranged side by side in a first direction orthogonal to a vertical direction, a direction orthogonal to the vertical direction and intersecting the first direction is assumed to be a second direction, the plurality of bus bars each include an upper connection portion extending in the second direction so as to be connected to the device, a lower connection portion extending in the second direction so as to be connected to the connector, and a coupling portion extending in the vertical direction so as to connect the upper connection portion and the lower connection portion to each other, a clearance is set between each of the bus bars and the corresponding holder in the second direction, and clearances are set between each of the holders and the bracket in the vertical direction and the first direction, respectively.

Advantageous Effects of Invention

According to the present disclosure, it is possible to provide a connection module that allows a device disposed on the upper case side and a connector disposed on the lower case side inside a casing to be electrically connected to each other, and that can be easily attached.

BRIEF DESCRIPTION OF DRAWINGS

FIG. 17 is a cross-sectional view taken along the line F-F in FIG. 15.

DESCRIPTION OF EMBODIMENTS

Figure 1:
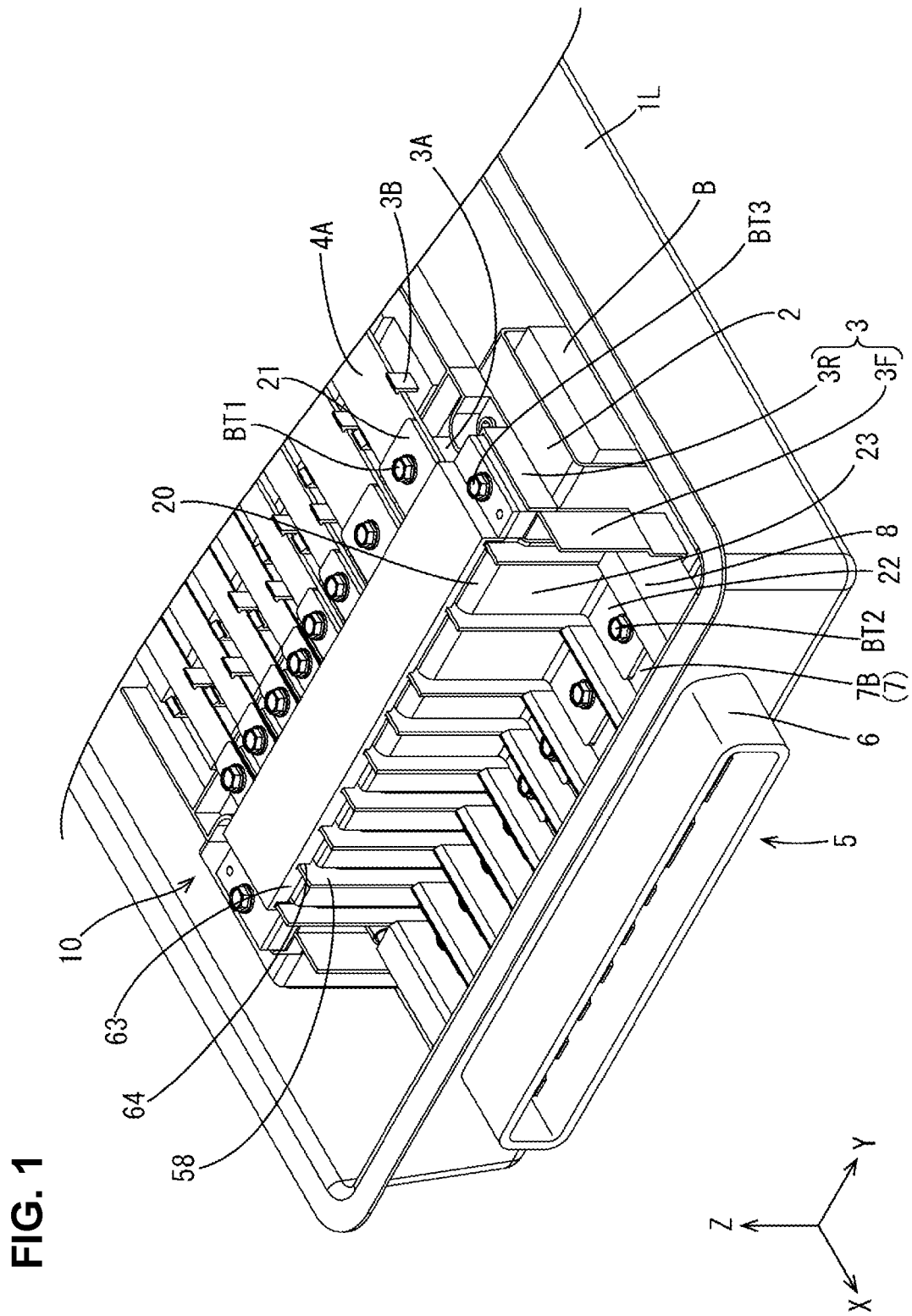
FIG. 1 is a perspective view showing an example in which a connection module according to Embodiment 1 is applied to a battery pack.

Description of Embodiments of the Present Disclosure

First, aspects of the present disclosure will be enumerated and described below.

(1) A connection module according to the present disclosure is a connection module configured to be accommodated inside a casing including an upper case and a lower case, the connection module including: a plurality of bus bars that electrically connect a device disposed on the upper case side inside the casing to a connector disposed on the lower case side inside the casing; a plurality of holders that hold the plurality of bus bars, each of the plurality of holders including a bus bar holding portion; and a bracket capable of locking the plurality of holders, wherein, in a state in which the plurality of holders that hold the plurality of bus bars are locked to the bracket, the plurality of bus bars are arranged side by side in a first direction orthogonal to a vertical direction, a direction orthogonal to the vertical direction and intersecting the first direction is assumed to be a second direction, the plurality of bus bars each include an upper connection portion extending in the second direction so as to be connected to the device, a lower connection portion extending in the second direction so as to be connected to the connector, and a coupling portion extending in the vertical direction so as to connect the upper connection portion and the lower connection portion to each other, a clearance is set between each of the bus bars and the corresponding holder in the second direction, and clearances are set between each of the holders and the bracket in the vertical direction and the first direction, respectively. Being "orthogonal" as used herein includes being orthogonal, and also includes being regarded as substantially orthogonal such as intersecting at an angle of from about 85° to 95° even if not being orthogonal.

With this configuration, the plurality of bus bars electrically connect the device disposed on the upper case side inside the casing to the connector disposed on the lower case side inside the casing. Accordingly, it is possible to complete the manufacturing process of a battery pack or the like by placing the upper case on the lower case so as to seal a gap therebetween after completing electrical connection of all the devices mounted inside the casing. In addition, the clearance is set between each of the bus bars and the corresponding holder in the front-rear direction, and the clearances are set between each of the holders and the bracket in the vertical direction and the left-right direction, respectively. Accordingly, it is possible to absorb positional shift and dimensional variation of the members and mounted devices in each of the directions.

(2) It is preferable that each of the plurality of holders includes a lock portion and a lock receiving portion, and the adjacent holders of the plurality of holders are locked to each other with a clearance therebetween in the first direction by the lock portion of one of the holders and the lock receiving portion of the other holder being locked to each other.

With this configuration, the holders each include the lock portion and the lock receiving portion, and it is therefore possible to couple the adjacent holders to each other, thus facilitating attachment between the holders. In addition, there is no need to separately form the holder that does not include the lock portion. Since the plurality of holders are locked to each other with the clearance therebetween in the left-right direction, it is possible to absorb positional shift and dimensional variation of the members and mounted devices in the left-right direction.

(3) It is preferable that the plurality of holders include an intermediate holder and end holders, in a state in which the plurality of holders are locked to the bracket, the holders are disposed on opposite sides of the intermediate holder in the first direction, and the holder is disposed only one side of the end holders in the first direction, the intermediate holder includes both a lock portion and a lock receiving portion, one of the end holders includes at least the lock portion out of the lock portion and the lock receiving portion, the other end holder includes only the lock receiving portion out of the lock portion and the lock receiving portion, and the adjacent holders of the plurality of holders are locked to each other with a clearance therebetween in the first direction by the lock portion of one of the holders and the lock receiving portion of the other holder being locked to each other.

With this configuration, it is possible to couple the adjacent holders to each other, thus facilitating attachment between the holders. In addition, the configuration includes the end holder that does not include the lock portion, and it is therefore possible to reduce the length of the bracket in the left-right direction. Since the plurality of holders are locked to each other with the clearance therebetween in the left-right direction, it is possible to absorb positional shift and dimensional variation of the members and mounted devices in the left-right direction.

(4) It is preferable that, on each of the holder, a holder-side guide is provided in the vicinity of the lock portion, and a holder-side guide receiving portion is provided in the vicinity of the lock receiving portion, the holder-side guide protrudes outward in the first direction, and the holder-side guide receiving portion receives the holder-side guide.

This configuration facilitates attachment between the holders.

(5) It is preferable that the bracket is provided with a rail extending in the first direction, and each of the holders is provided with a rail-side guide configured to be fitted to the rail.

This configuration facilitates attachment of the holders to the bracket.

(6) It is preferable that a plurality of the rails and a plurality of the rail-side guides are provided so as to be spaced apart in the second direction.

With this configuration, it is possible to increase the locking force of the holders provided by the bracket. In addition, it is possible to suppress rattling of the holders attached to the bracket.

(7) It is preferable that each of the plurality of holders is provided with an engaging portion that protrudes downward, and an engagement receiving portion with which the engaging portion engages from below is formed in the bracket.

This configuration allows the holders to be attached to the bracket from above, thus improving the ease of attachment of the holders to the bracket.

(8) It is preferable that the connection module further includes a cover configured to cover the bus bars and the holders from above and be fixed to the bracket.

With this configuration, it is possible to prevent the bus bars and the holders from being detached from the bracket.

Details of Embodiments of the Present Disclosure

Hereinafter, embodiments of the present disclosure will be described. It should be noted that the present disclosure is not limited to these examples, but is defined by the claims, and is intended to include all modifications which fall within the scope of the claims and the meaning and scope of equivalents thereof.

Embodiment 1

Embodiment 1 of the present disclosure will be described with reference to FIGS. 1 to 14. The following description will be given assuming that the direction indicated by the arrow Z is the upward direction, the direction indicated by the arrow X is the forward direction, and the direction indicated by the arrow Y is the leftward direction. Here, the left-right direction is an example of a first direction, and the front-rear direction is an example of a second direction. For a plurality of identical members, reference numerals may be assigned to some of the members, and reference numerals may be omitted for the other members.

Connection Module

Figure 2:
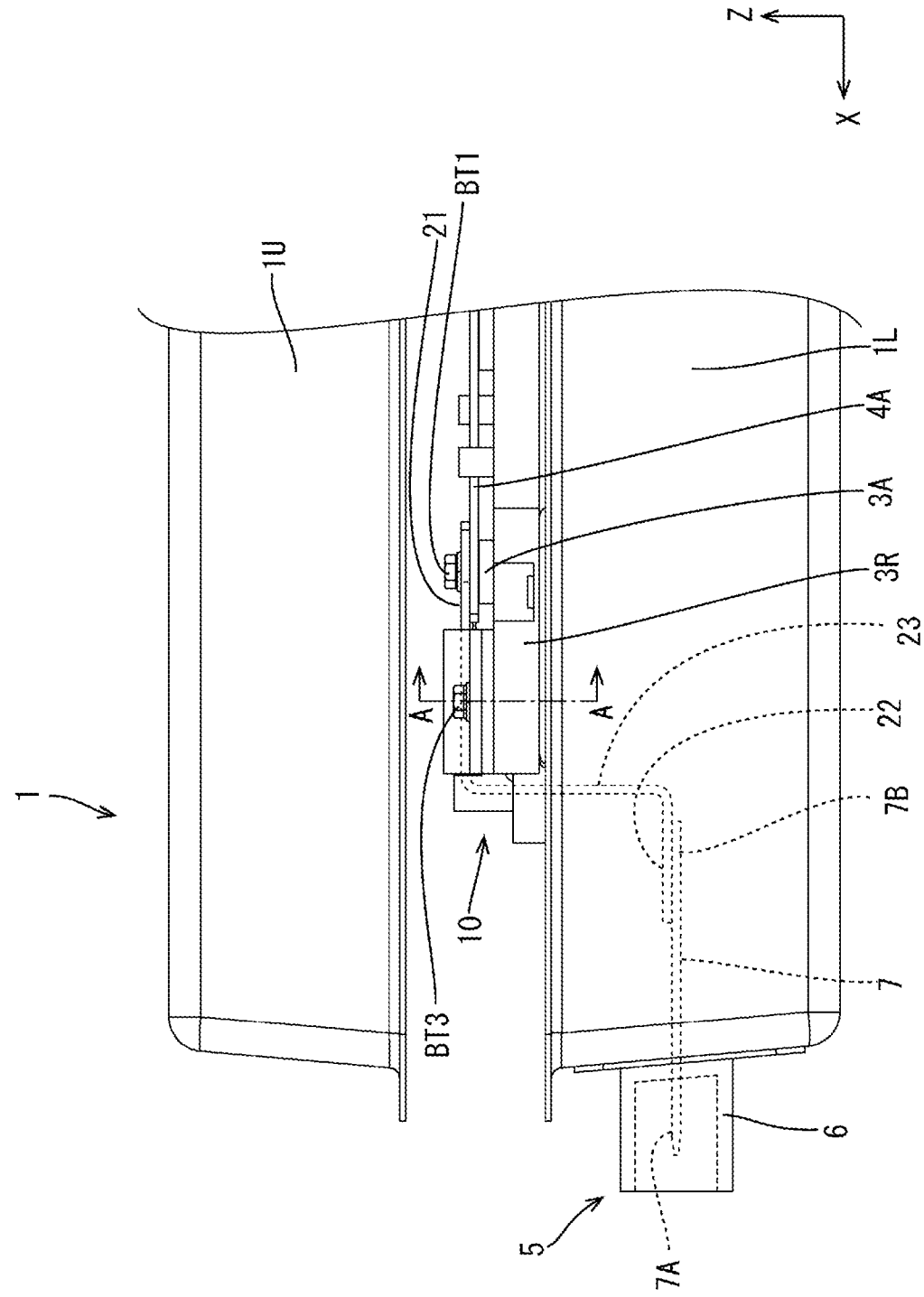
FIG. 2 is a side view of the connection module applied to the battery pack.
Figure 5:
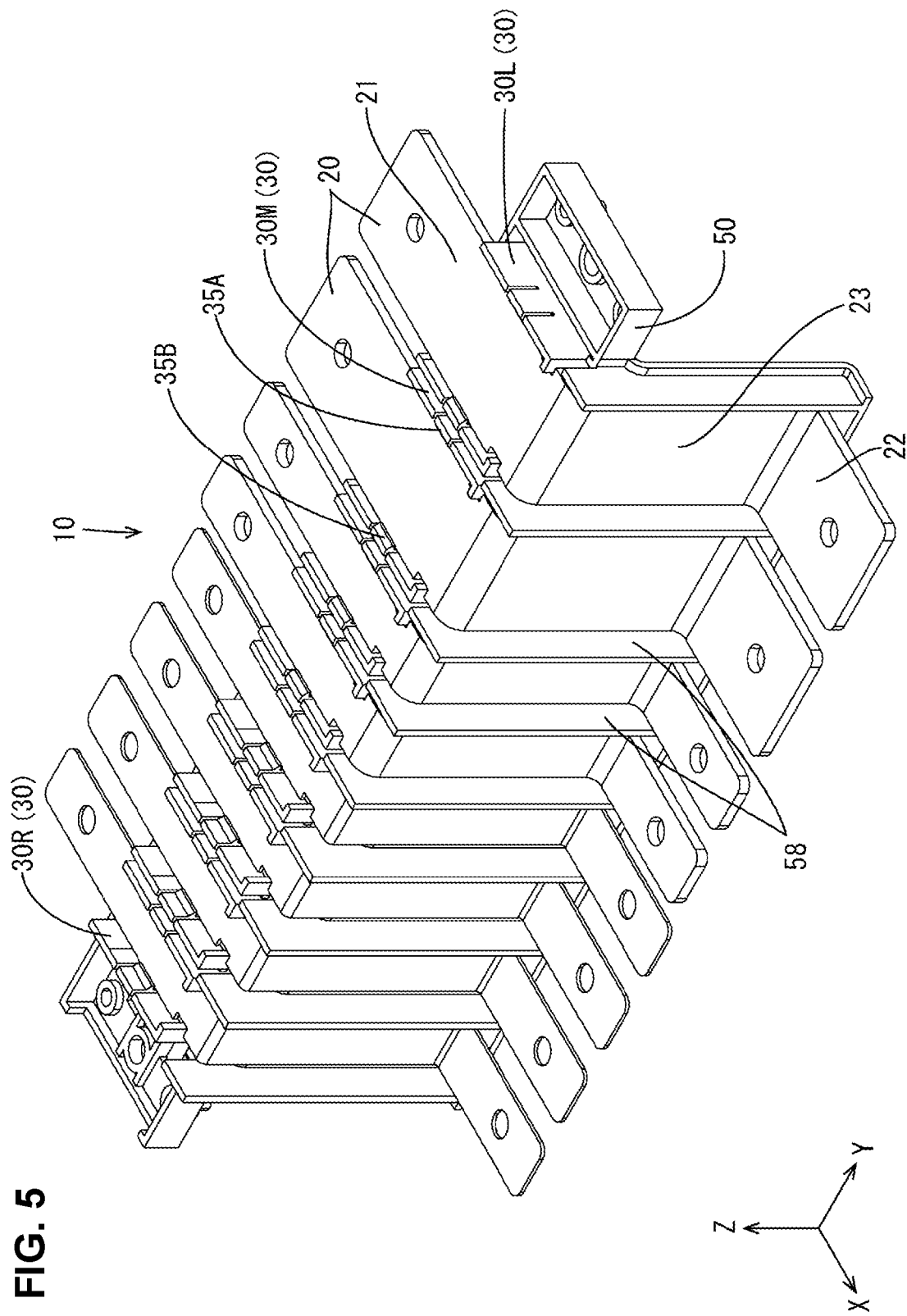
FIG. 5 is a perspective view of the connection module before the cover is fixed thereto.

As shown in FIG. 5, a connection module 10 according to Embodiment 1 includes a plurality of bus bars 20, a plurality of holders 30 that hold the plurality of bus bars 20, and a bracket 50 that is locked to the plurality of holders 30. As shown in FIG. 2, the connection module 10 is accommodated inside a battery pack 1 (an example of a casing). As will be described below, the connection module 10 is placed on a terminal block 3 inside the battery pack 1, and electrically connects a device-side connection portion 4A of a device 4 (not shown) and a connector-side connection portion 7B of a connector 5 to each other.

Battery Pack, Upper Case, Lower Case

As shown in FIG. 2, the battery pack 1 includes an upper case 1U that is open upward, and a lower case 1L that is open downward. A known sealing member (not shown) is interposed between an edge portion of the opening of the upper case 1U and an edge portion of the opening of the lower case 1L. The upper case 1U is placed on the lower case 1L so as to close the openings, and a gap therebetween is sealed in a liquid-tight manner by the sealing member, whereby the battery pack 1 provides waterproofing.

As shown in FIG. 1, a battery cell B having a rectangular parallelepiped shape is placed inside the lower case 1L. The upper, front, and rear sides of the battery cell B are covered by a battery bracket 2 formed in the shape of a protrusion that protrudes upward, and the battery cell B is fixed to the lower case 1L. A terminal block 3 having a rectangular shape in a plan view is mounted and fixed to the battery bracket 2. The terminal block 3 is formed to have a smaller width in the left-right direction than the width in the left-right direction of the battery bracket 2. The terminal block 3 includes a rear terminal block 3R that is mounted to an upper surface of the battery bracket 2 and that extends rearward, and a front terminal block 3F that is mounted to a front surface of the battery bracket 2 and that extends downward and forward from the front end of the rear terminal block 3R. As shown in FIG. 2, the rear terminal block 3R protrudes above an upper edge portion of the lower case 1L in a state in which the rear terminal block 3R is mounted to the lower case 1L. Thus, in a state in which the lower case 1L and the upper case 1U are attached to each other, the rear terminal block 3R is disposed on the upper case 1U side inside the battery pack 1.

Figure 3:
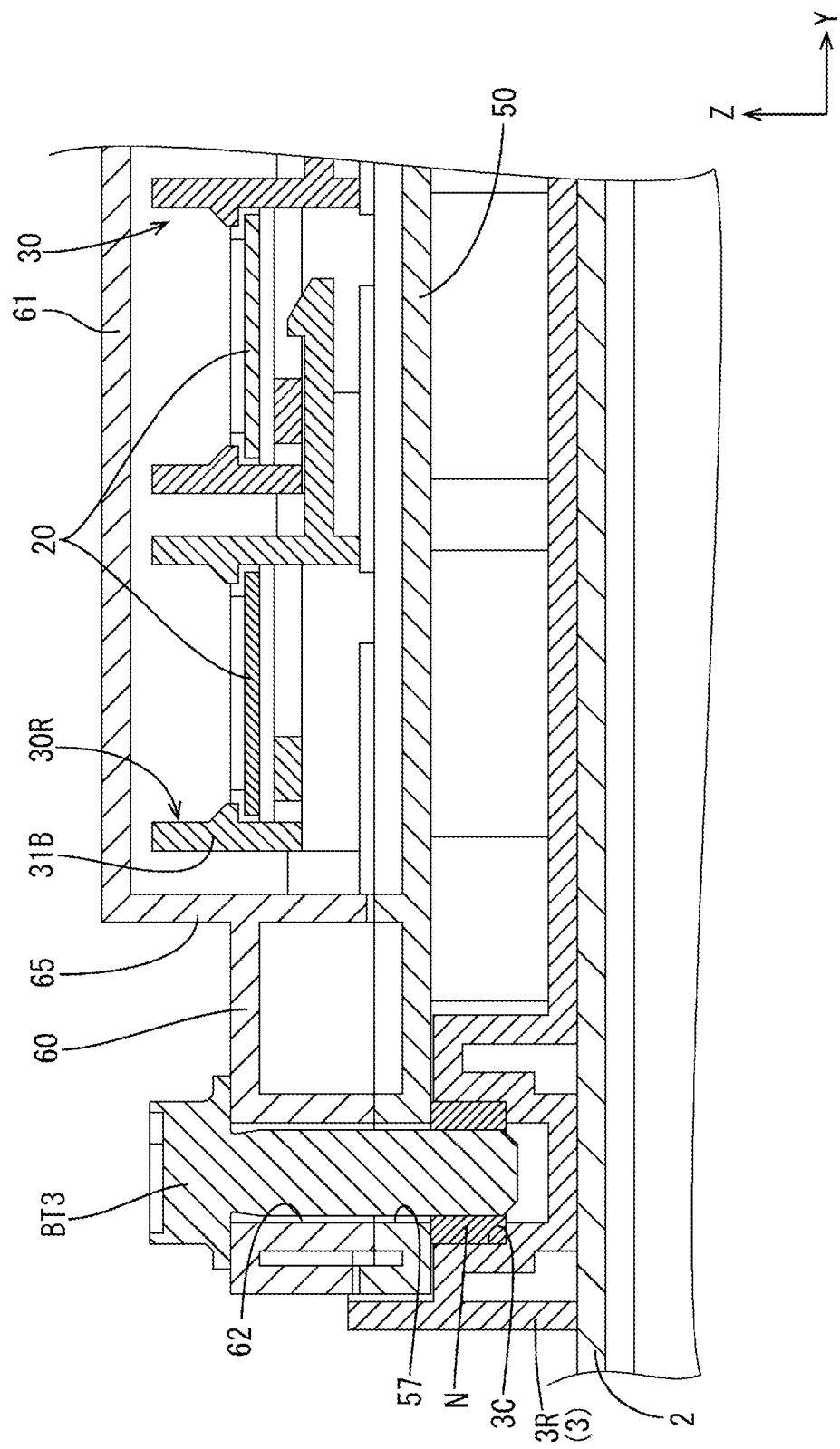
FIG. 3 is a view showing the periphery of a right end holder in a cross section taken along the line A-A in FIG. 2.

In a state in which the lower case 1L and the upper case 1U are attached to each other, the device 4 (not shown) is disposed on the upper case 1U side inside the battery pack 1, and the device-side connection portion 4A extends forward from the device 4 as shown in FIG. 1. The device-side connection portion 4A is provided rearward of the rear terminal block 3R, and is held by at least one locking piece 3B that protrudes upward. A bolt fixing portion 3A that receives a bolt BT1 is formed forward of the locking piece 3B of the rear terminal block 3R so as to protrude upward, and a bolt fastening hole (not shown) formed in a front end portion of the device-side connection portion 4A is disposed on the bolt fixing portion 3A. The connection module 10 is placed at a portion of the rear terminal block 3R that is located forward of the bolt fixing portion 3A, thus allowing each bus bar 20 of the connection module 10 to be connected to the corresponding device-side connection portion 4A. As shown in FIG. 3, a nut accommodating portion 3C that accommodates a nut N that is fastened to a bolt BT3 described below is provided at each of the right and left ends of the rear terminal block 3R at a position at which the connection module 10 is placed. Although not shown, projection receiving portions that receive projecting portions 59 of a bracket 50 described below are provided forward of the right nut accommodating portion 3C and rearward of the left nut accommodating portion 3C, and the connection module 10 is fixed to the terminal block 3 by locking between the projecting portions 59 and the projection receiving portions.

As shown in FIGS. 1 and 2, a connector 5 for external output is disposed on the front side of the lower case 1L. As shown in FIG. 1, the connector 5 is formed extending through a side surface of the lower case 1L on the front side in the front-rear direction. The connector 5 includes a hood portion 6 that is open forward, terminal fittings 7, and a terminal accommodating portion 8 that extends rearward of the hood portion 6 and in which the terminal fittings 7 are accommodated side by side in the left-right direction. A rear end portion of the terminal accommodating portion 8 is fixed by the front terminal block 3F. As shown in FIG. 2, each terminal fitting 7 includes a tab 7A that protrudes forward inside the hood portion 6. A rear end portion of the terminal fitting 7 serves as a connector side connection portion 7B, and a bolt fastening hole (not shown) is formed in the connector-side connection portion 7B. As shown in FIG. 1, the terminal accommodating portion 8 is open upward and rearward, and is configured to receive the bus bars 20 of the connection module 10 from above and connect the bus bars 20 to the corresponding connector-side connection portions 7B. Bolt fixing portions (not shown) are provided at a rear end portion of the terminal accommodating portion 8 so as to protrude upward and receive bolts BT2. Bolt fastening holes (not shown) are disposed on the bolt fixing portions.

Bus Bar, Upper Connection Portion, Lower Connection Portion, Coupling Portion

Figure 12:
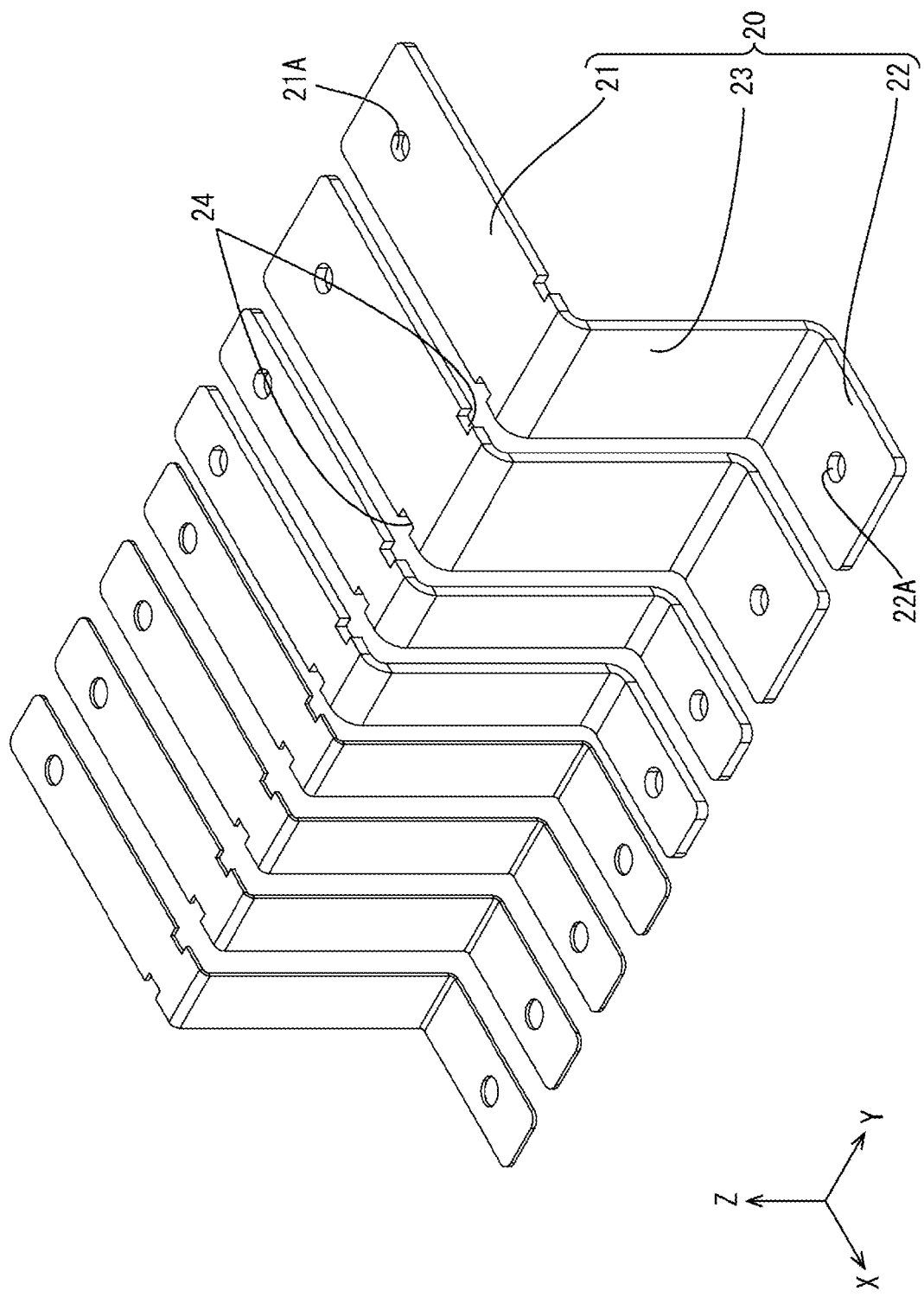
FIG. 12 is a perspective view of bus bars.

Each bus bar 20 is made of a conductive metal such as copper, and has the shape of an elongated plate that is bent in a crank shape as shown in FIG. 12. The bus bar 20 includes an upper connection portion 21, a lower connection portion 22, and a coupling portion 23 that connects the upper connection portion 21 and the lower connection portion 22 to each other. The coupling portion 23 extends in a vertical direction, and the front-rear direction thereof corresponds to the plate thickness direction. The upper connection portion 21 extends rearward continuously from the upper end of the coupling portion 23, and the vertical direction thereof corresponds to the plate thickness direction. The lower connection portion 22 extends forward continuously from the lower end of the coupling portion 23, and the vertical direction thereof corresponds to the plate thickness direction. Bolt fastening holes 21A and 22A are respectively formed on the rear side of the upper connection portion 21 and the front side of the lower connection portion 22. A pair of recesses 24 are provided at left and right end portions of the upper connection portion 21. The recesses 24 are disposed on the front side of the upper connection portion 21. The dimensions of each bus bar 20 in the plate thickness direction and the width direction can be changed according to the width of a complementary member to which the bus bar 20 is to be connected, the desired strength, and so forth. The plurality of (eight in the present embodiment) bus bars 20 may have the same shape, or may have different shapes. Three types of bus bars that differ in dimensions are used as the bus bars 20 according to the present embodiment.

Holder, Intermediate Holder, Right End Holder, Left End Holder

The plurality of holders 30 are composed of intermediate holders 30M, a right end holder 30R (an example of an end holder), and a left end holder 30L (an example of an end holder). Although the details will be described below, the plurality of holders 30 are coupled to each other in the left-right direction in the connection module 10 as shown in FIG. 5. The right end holder 30R is disposed at the right end, and the left end holder 30L is disposed at the left end. The intermediate holders 30M are disposed between the right end holder 30R and the left end holder 30L. In the following, when there is no need to distinguish between the intermediate holders 30M, the right end holder 30R, and the left end holder 30L, the term holder 30 will be used.

Figure 8:
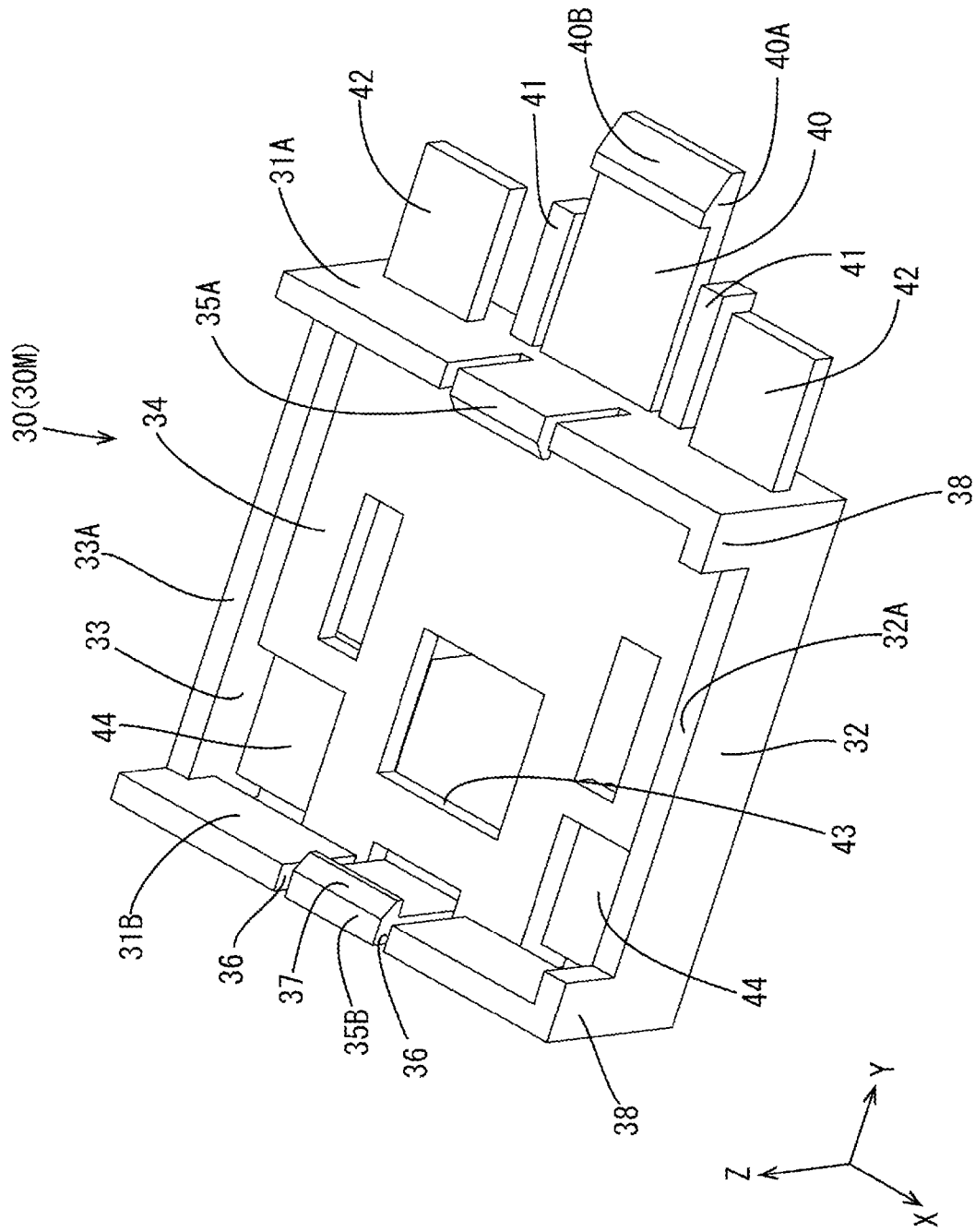
FIG. 8 is an upper perspective view of the holder.

The holder 30 is made of an insulating synthetic resin, and has the shape of a rectangular frame that is open upward as shown in FIG. 8. One holder 30 is configured to hold one bus bar 20. Each holder 30 is formed so as to correspond to the dimensions of the corresponding bus bar 20. In the present embodiment, three types of holders that differ in dimensions are used as the holders 30 that hold the bus bars 20 according to the dimensions of the bus bars 20. Each holder 30 has a pair of side walls 31A and 31B in the left-right direction. The pair of side walls 31A and 31B are connected to each other by a front wall 32 at the front end, and by a rear wall 33 at the rear end. The lower ends of the pair of side walls 31A and 31B, the front wall 32, and the rear wall 33 are connected to each other by the bottom wall 34.

Bus Bar Holding Portion, Rail-Side Guide

Figure 4:
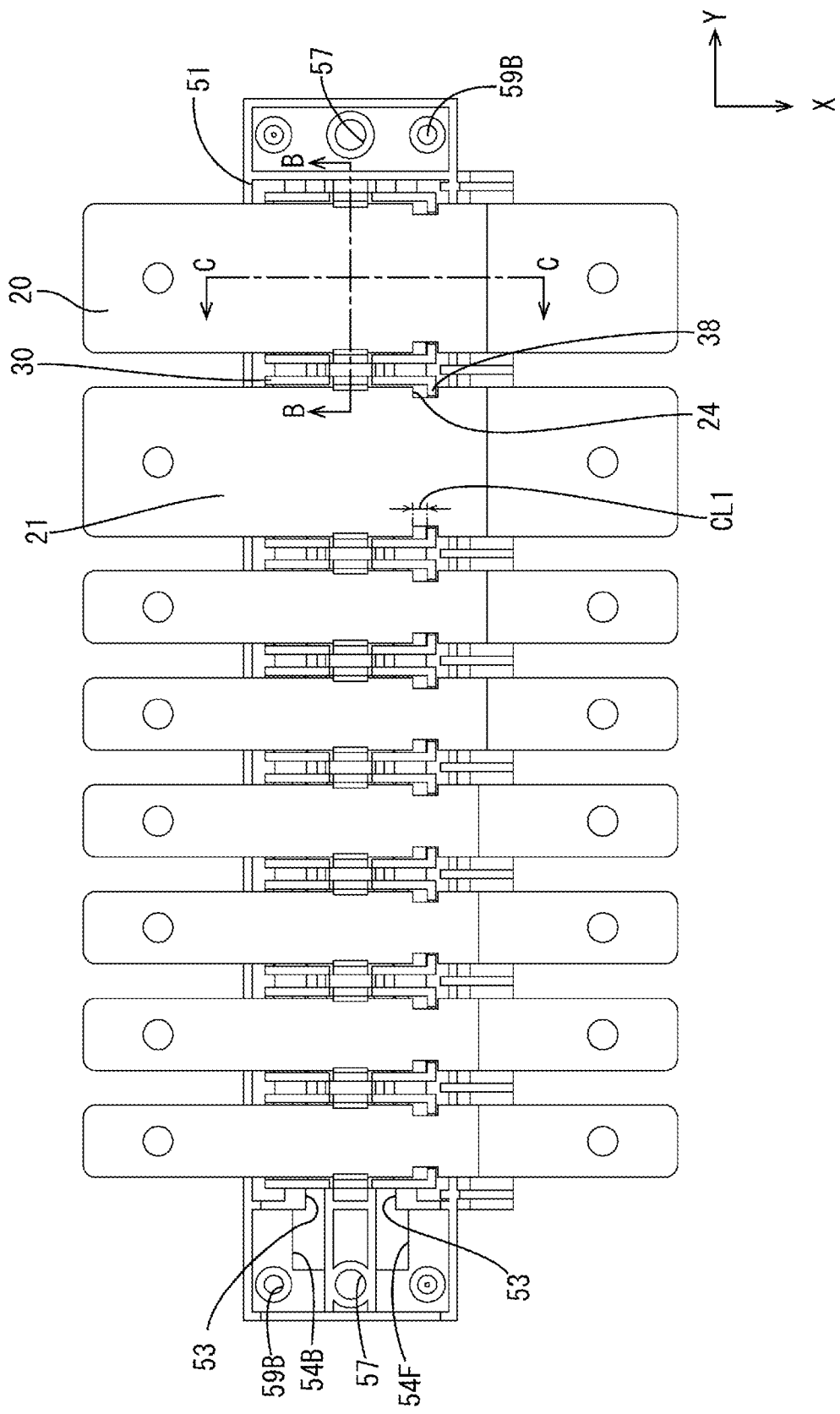
FIG. 4 is a plan view of the connection module before a cover is fixed thereto.
Figure 6:
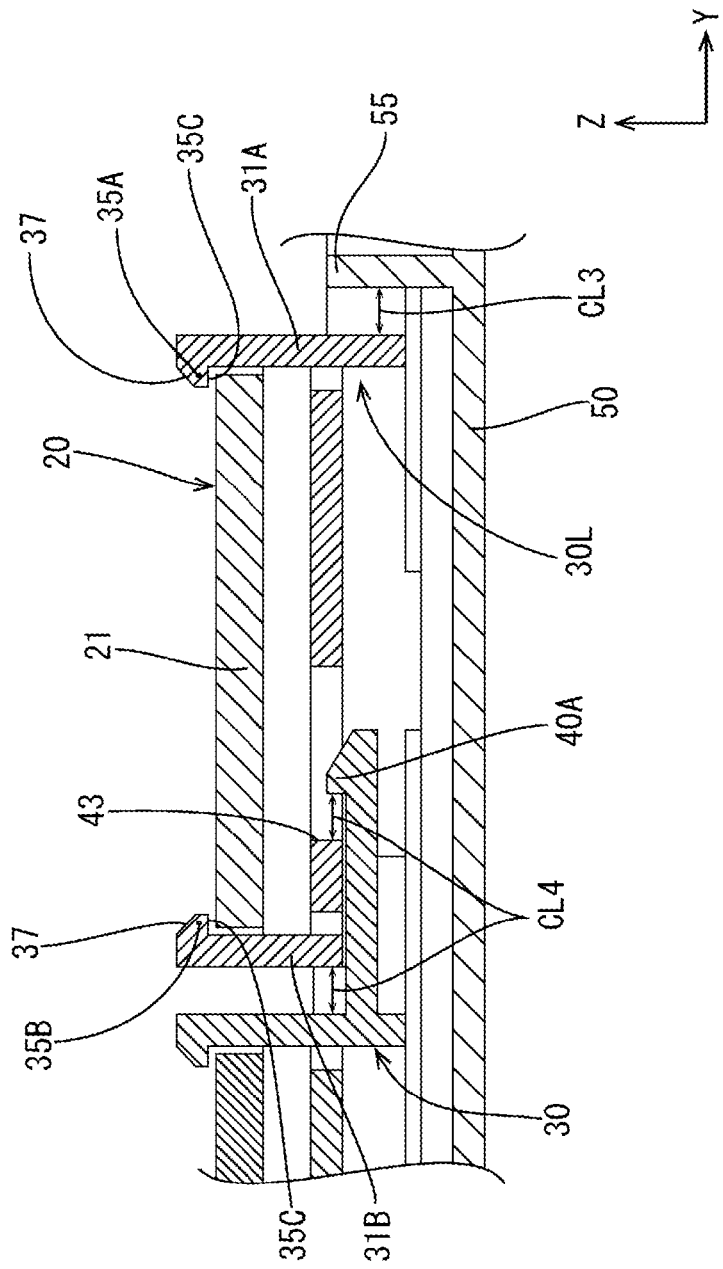
FIG. 6 is a cross-sectional view taken along the line B-B in FIG. 4.
Figure 7:
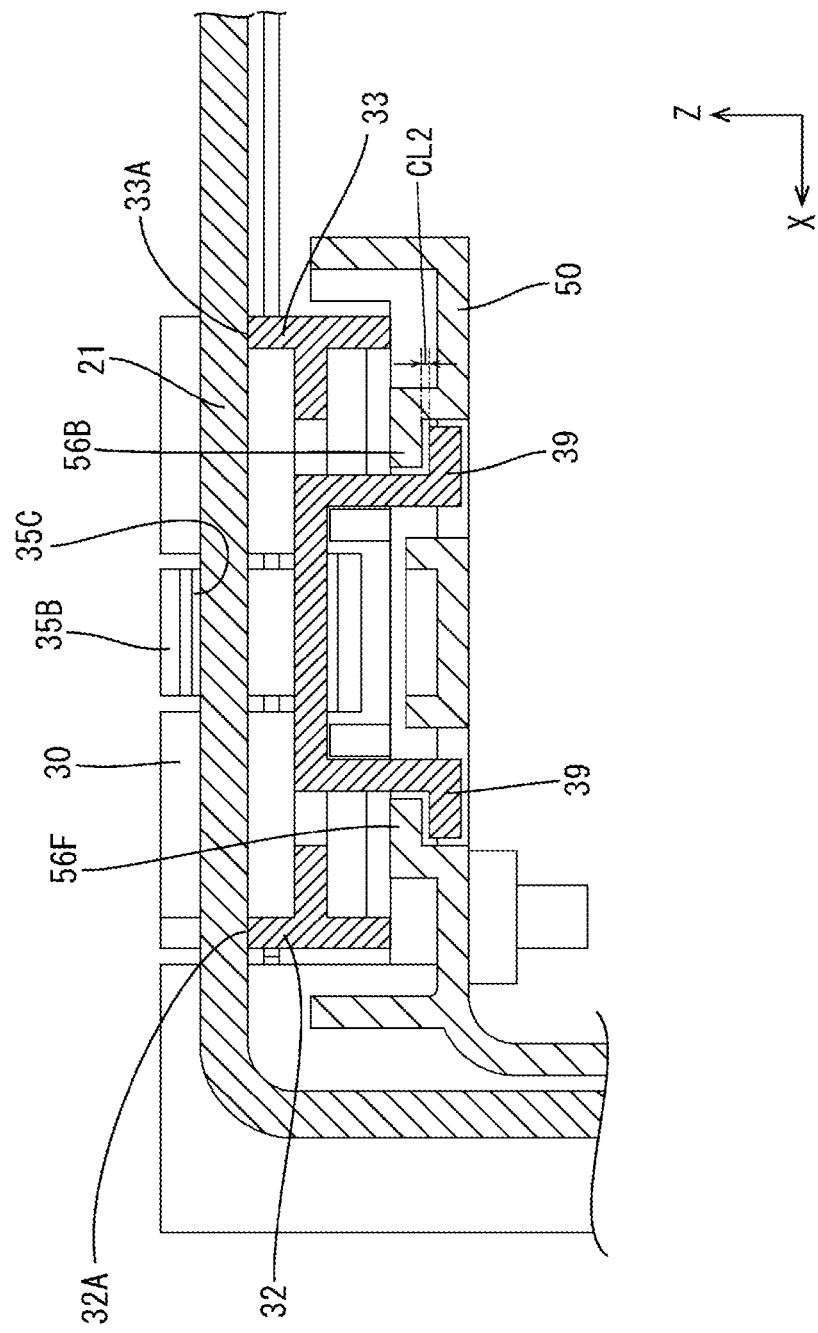
FIG. 7 is a view showing the periphery of a holder in a cross section taken along the line C-C in FIG. 4.
Figure 9:
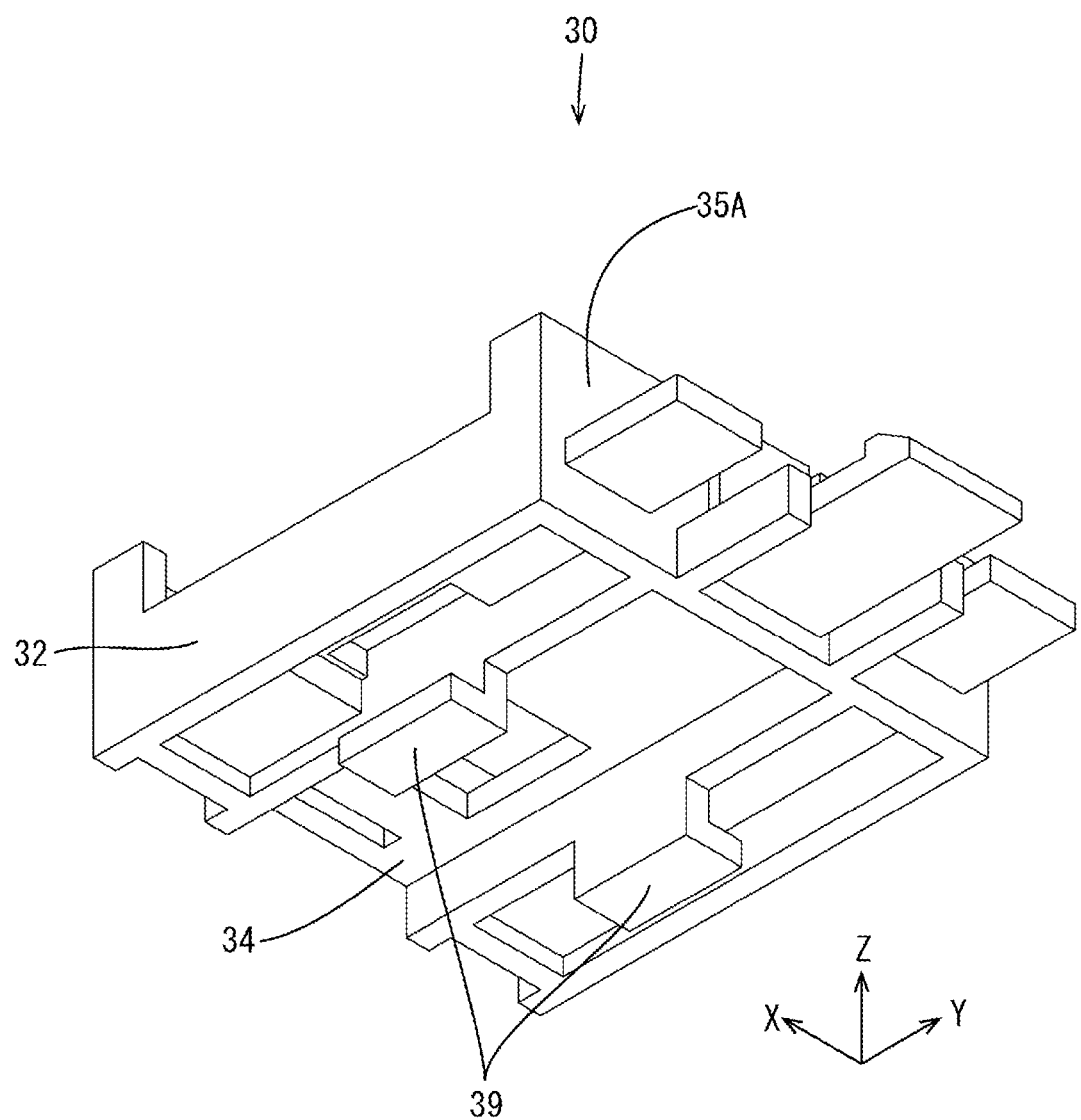
FIG. 9 is a lower perspective view of the holder.

As shown in FIG. 8, the holder 30 includes a pair of bus bar holding portions 35A and 35B on the pair of side walls 31A and 31B. The bus bar holding portions 35A and 35B are disposed at a central portion of the holder 30 in the front-rear direction. The bus bar holding portions 35A and 35B are formed protruding toward the respective opposing side walls 31B and 31A. Cut-out portions 36 are formed in portions of the side walls 31B and 31A that are located forward and rearward of the bus bar holding portions 35A and 35B. Thus, central portions of the side walls 31A and 31B respectively including the bus bar holding portions 35A and 35B can undergo bending deformation in the left-right direction. Tapered surfaces 37 that are inclined so as to respectively approach the side walls 31A and 31B in a direction toward the upper side are provided on the upper side of the bus bar holding portions 35A and 35B. As shown in FIG. 6, each of the lower ends of the bus bar holding portions 35A and 35B forms a lower surface 35C having a steep shape. As shown in FIG. 7, upper surfaces 32A and 33A of the front wall 32 and the rear wall 33 are provided below the lower surfaces 35C of the bus bar holding portions 35A and 35B, and the interval in the vertical direction between the lower surfaces 35C of the bus bar holding portions 35A and 35B and the upper surfaces 32A and 33A of the front wall 32 and the rear wall 33 is set to be the same as or slightly larger than the thickness of the upper connection portion 21. As shown in FIG. 8, a pair of protrusions 38 are provided at left and right end portions of the front wall 32 so as to be continuous from the pair of side walls 31A and 31B. The protrusions 38 are disposed above the upper surface 32A of the front wall 32. As shown in FIG. 4, the thickness of each protrusion 38 in the front-rear direction is set to be smaller than the length of each recess 24 in the front-rear direction. As shown in FIG. 9, a pair of rail-side guides 39 are provided on the front and rear sides of the bottom wall 34 so as to extend downward. The lower ends of the pair of rail-side guides 39 extend in the front-rear direction so as be away from each other.

Lock Portion, First Holder-Side Guide, Second Holder-Side Guide

As shown in FIG. 8, the intermediate holder 30M includes, on the side wall 31A, a lock piece 40, at least one first holder-side guide 41 (an example of a holder-side guide), and at least one second holder-side guide 42 (an example of the holder side guide). The lock piece 40 is disposed at a central portion of each intermediate holder 30M in the front-rear direction, and protrudes leftward of the side wall 31A. A lock portion 40A is provided at a distal end of the lock piece 40 so as to protrude upward. The left side of the lock portion 40A forms a tapered surface 40B that extends upward in a direction toward the right side. The right end of the lock portion 40A has a steep shape. The first holder-side guide 41 and the second holder-side guide 42 protrude leftward of the side wall 31A, and the protruding lengths thereof are smaller than the protruding length of the lock piece 40. A pair of second holder-side guides 42 are provided on the front and rear sides of the side wall 31A. The second holder-side guides 42 have a length in the front-rear direction that is larger than a length thereof in the vertical direction. A pair of first holder-side guides 41 are disposed between the lock piece 40 and the second holder-side guides 42 in the front-rear direction. The first holder-side guides 41 have a length in the vertical direction that is larger than a length thereof in the front-rear direction. As in the case of the intermediate holder 30M, the right end holder 30R includes a lock piece 40, at least one first holder-side guide 41, and at least one second holder-side guide 42.

Figure 11:
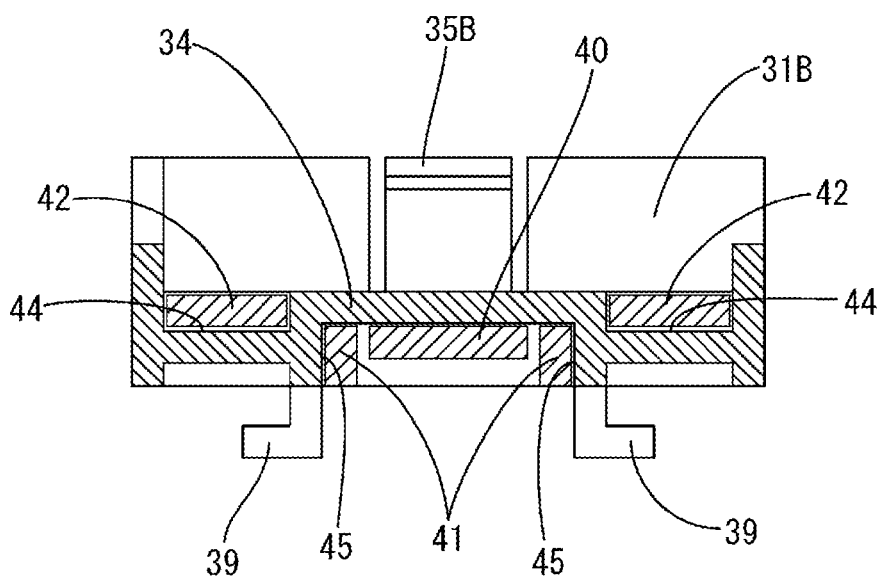
FIG. 11 is a cross-sectional view taken along the line D-D in FIG. 10.

Lock Receiving Portion, First Holder-Side Guide Receiving Portion, Second Holder-Side Guide Receiving Portion As shown in FIG. 8, the bottom wall 34 of the holder 30 has a lock receiving portion 43 formed in a central portion thereof in the front-rear direction. The lock receiving portion 43 is located on the right side of the bottom wall 34. As shown in FIG. 6, the lock receiving portion 43 is configured to be locked to a lock portion 40A of another holder 30 that is adjacent on the right side. A clearance CL4 in the left-right direction is set for the locking between the lock portion 40A and the lock receiving portion 43. As shown in FIG. 8, a pair of second holder-side guide receiving portions 44 (an example of a holder-side guide receiving portion) are provided on the front and rear sides on the side wall 31B side of the bottom wall 34. The second holder-side guide receiving portions 44 are formed so as to be recessed below the height of the bottom wall 34 on which the lock receiving portions 43 are located. The pair of second holder-side guide receiving portions 44 are connected to the front wall 32 or the rear wall 33, but not connected to the side wall 31B, and are open rightward. Accordingly, as shown in FIG. 11, the pair of second holder-side guide receiving portions 44 are configured to receive a pair of second holder-side guides 42 of another holder 30 that is adjacent on the right side. The first holder-side guides 41 can be engaged with first holder-side guide receiving portions 45 (an example of a holder-side guide receiving portion) that are each formed by a portion of the bottom wall 34.

Figure 10:
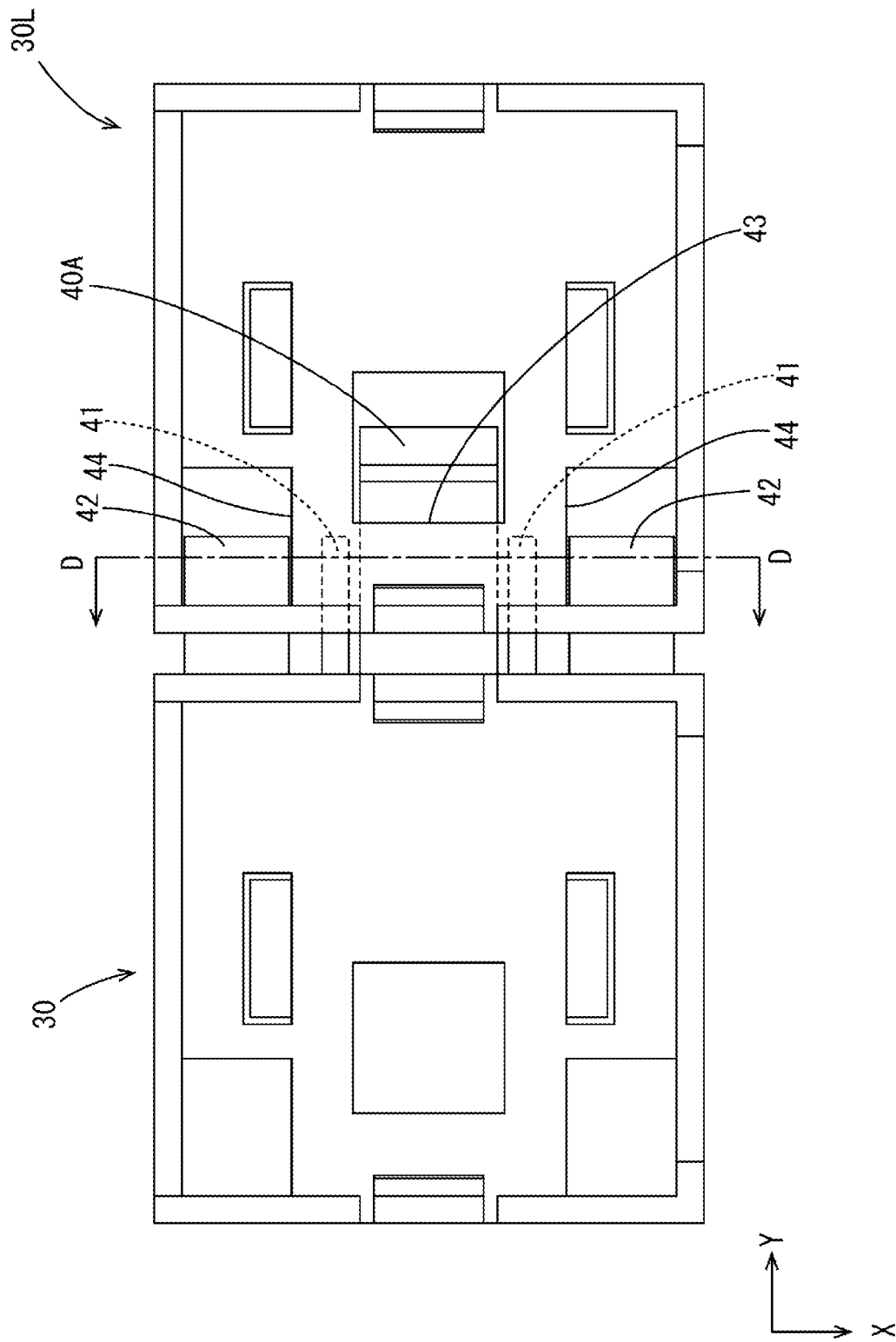
FIG. 10 is a plan view of two holders that are coupled to each other.

As described above, the plurality of holders 30 are attached to the connection module 10 while being coupled to each other in the left-right direction by locking between the lock portion 40A and the lock receiving portion 43. At this time, the holders 30 are disposed on opposite sides of each intermediate holder 30M in the left-right direction. On the other hand, as shown in FIGS. 6 and 10, no holder 30 is disposed on the left side of the end holder 30L, and therefore the end holder 30L is not provided with the lock piece 40 including the lock portion 40A, the first holder-side guides 41, and the second holder-side guide 42. Similarly, as shown in FIG. 3, no holder 30 is disposed on the right side of the right end holder 30R. Therefore, the right end holder 30R may or may not include the lock receiving portion 43, the first holder-side guide receiving portions 45, and the second holder-side guide receiving portions 44. Note that, in Embodiment 1, the intermediate holder 30M including the lock receiving portion 43, the first holder-side guide receiving portions 45, and the second holder-side guide receiving portions 44 is also used as the right end holder 30R.

Bracket, Rail

Figure 13:
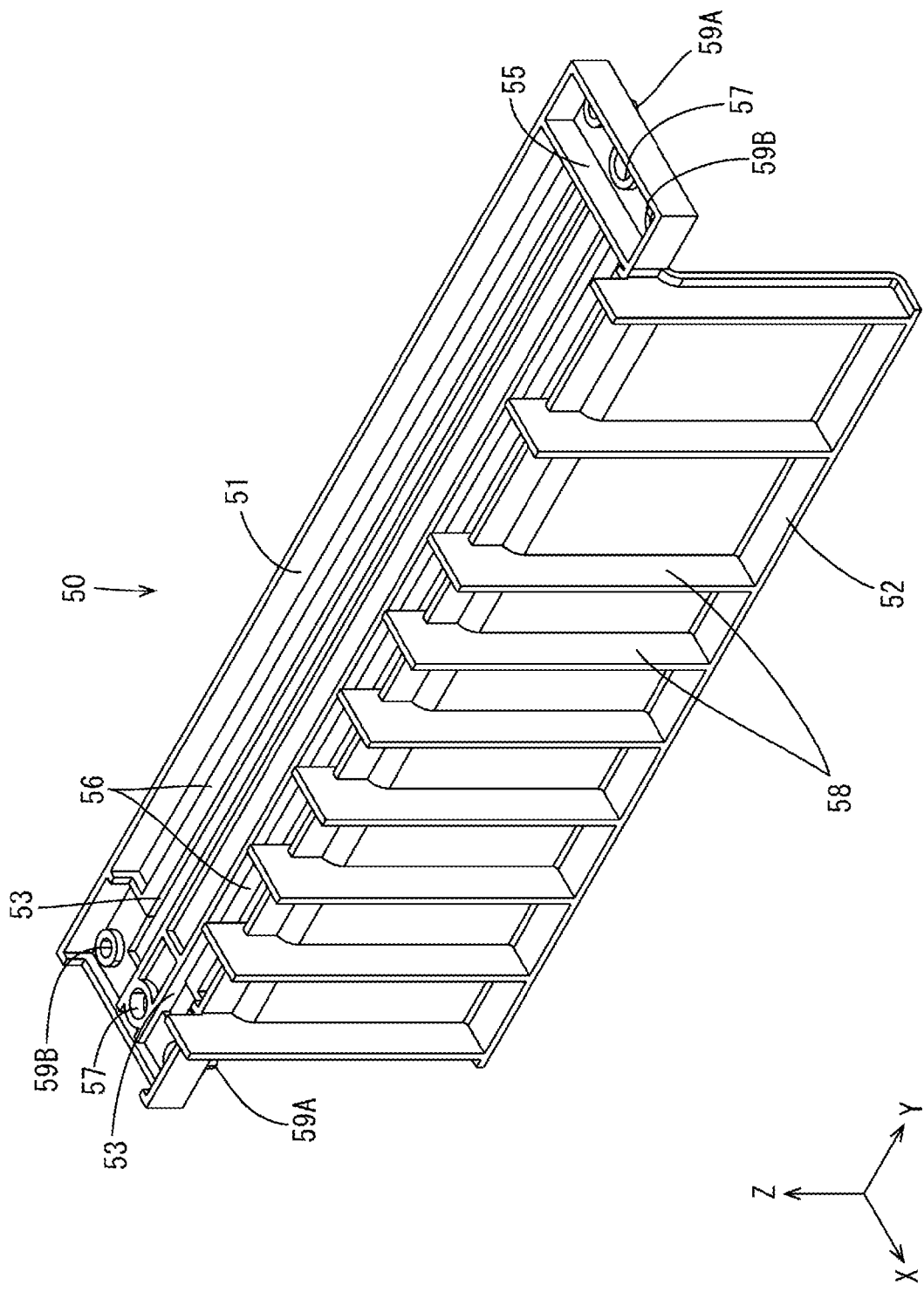
FIG. 13 is a perspective view of a bracket.

The bracket 50 is made of an insulating synthetic resin, and includes, as shown in FIG. 13, a holder base portion 51 and a bus bar accommodating portion 52. The holder base portion 51 has the shape of a frame that extends in the left-right direction. A pair of rails 53 extending through the holder base portion 51 in the vertical direction are formed in a slit shape on the holder base portion 51 so as to extend in the left-right direction. The pair of rails 53 are arranged side by side and spaced apart in the front-rear direction. As shown in FIG. 4, the right end of each rail 53 serves as an insertion opening 54 that is formed to be wide. As shown in FIG. 13, a stopper portion 55 in the form of an upwardly extending wall surface is provided at the left ends of the rails 53. As shown in FIG. 6, in a state in which the plurality of holders 30 are attached to the bracket 50, the stopper portion 55 faces the side wall 31A of the left end holder 30L. As shown in FIG. 13, the pair of rails 53 includes a rear rail 53B located on the rear side and a front rail 53F located on the front side. A rear extension portion 56B that extends forward is formed at a rear edge portion of the rear rail 53B. A front extension portion 56F that extends rearward is formed at a front hole edge portion of the front rail 53F. The rear extension portion 56B and the front extension portion 56F are collectively denoted as the extension portion 56. As shown in FIG. 7, the front extension portion 56F and the rear extension portion 56B support the holders 30 from below in a state in which the holders 30 are attached to the bracket 50. As shown in FIG. 4, fixing holes 57 for fixing a cover 60 described below are formed in the left and right ends of the holder base portion 51. Projection receiving portions 59B are provided rearward of the right fixing hole 57 and forward of the left fixing hole 57. The projection receiving portions 59B are configured to receive projecting portions 67 of a cover 60 described below. As shown in FIG. 13, projecting portions 59A are provided forward of the right fixing hole 57 and rearward of the left fixing hole 57 so as to protrude downward. The bus bar accommodating portion 52 is provided extending downward from the front end of the holder base portion 51. The bus bar accommodating portion 52 includes a plurality of partition plates 58 that are arranged side by side in the left-right direction. As shown in FIG. 5, the plurality of holders 30 and the plurality of bus bars 20 are attached to the bracket 50, and the bus bars 20 are separated by the partition plates 58 so as not to be in contact with each other.

Cover

Figure 14:
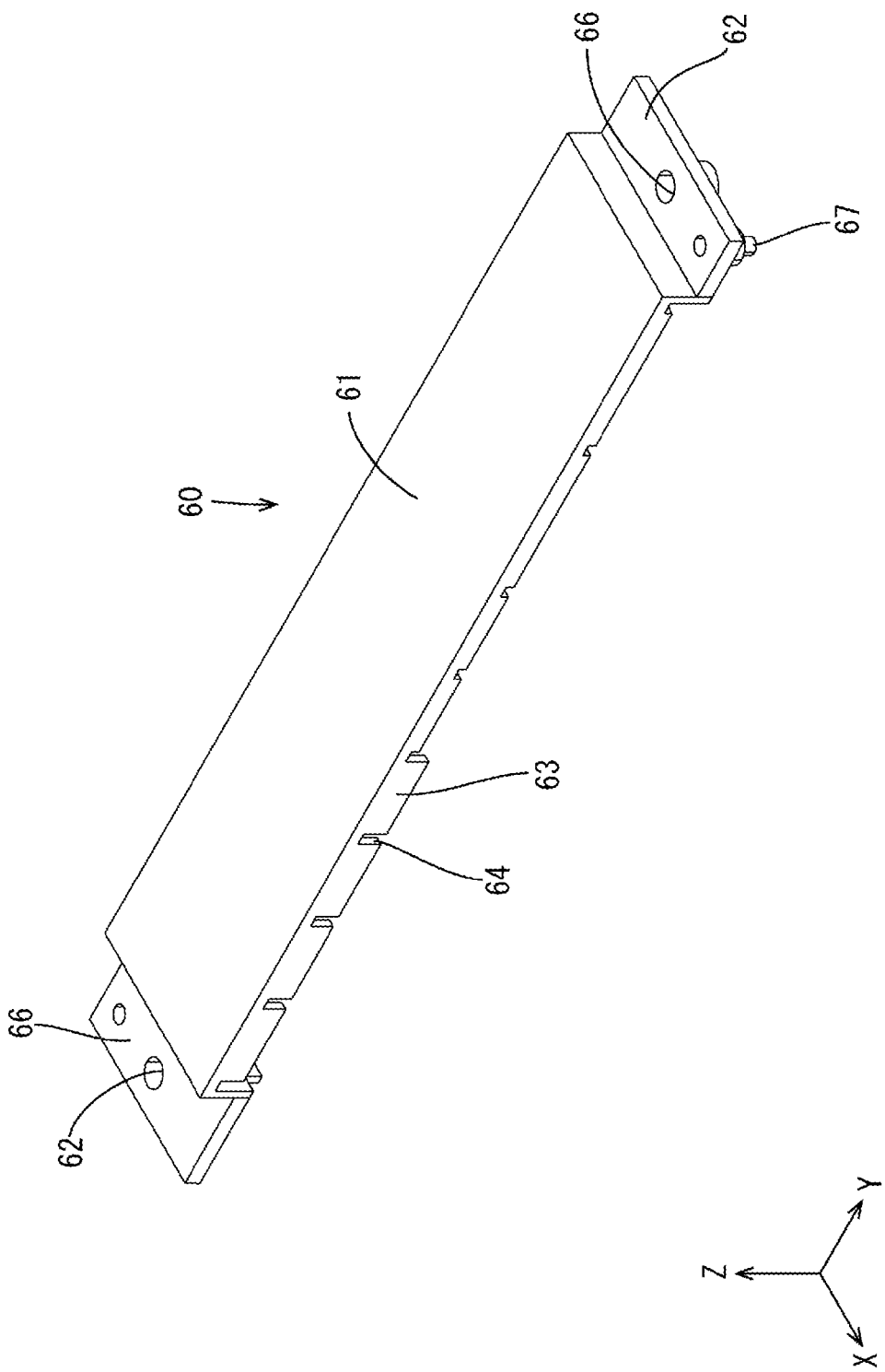
FIG. 14 is a perspective view of a cover.

The cover 60 is made of an insulating synthetic resin, and includes, as shown in FIG. 14, a body portion 61 having a plate shape that extends in the left-right direction, and fixing portions 66 disposed on opposite sides of the body portion 61 in the left-right direction. The fixing portions 66 each have a shape that protrudes downward as compared with the body portion 61. A fixing hole 62 is formed in a central portion of each of the fixing portions 66 in the front-rear direction. Projecting portions 67 are provided rearward of the right fixing hole 62 and forward of the left fixing hole 62 so as to protrude downward. A protection wall 63 is provided at the front end of the body portion 61 so as to extend downward. Groove portions 64 are formed in the protection wall 63. As shown in FIGS. 1 and 3, the cover 60 is placed on and fixed to the bracket 50 to which the plurality of holders 30 and the plurality of bus bars 20 are attached. As shown in FIG. 1, the groove portions 64 are configured to receive the partition plates 58. As shown in FIG. 3, the right end of the body portion 61 serves as a retaining portion 65 in the form of a wall surface that extends downward, and faces the side wall 31B of the right end holder 30R. The retaining portion 65 prevents the plurality of holders 30 from being dislodged to the right of the bracket 50.

Attachment of Connection Module

By inserting the rail-side guides 39 of each holder 30 into the insertion opening 54 of the bracket 50, and moving the holder 30 to the left, the holder 30 is attached to the bracket 50 in a state in which the rail-side guide 39 are fitted to the rails 53 (see FIG. 4). At this time, the left end holder 30L is attached first, and the right end holder 30R is attached last. In the process of this attachment, adjacent holders 30 are coupled to each other in the left-right direction. When holders 30 are moved toward each other, the tapered surface 40B of a holder 30 comes into contact with the side wall 31B of a holder 30 adjacent on the left side. By moving the holders 30 further toward each other, the lock piece 40 enters below the bottom wall 34 of the holder 30 on the left side while being bent downward, and is locked to the lock receiving portion 43 (see FIG. 6). During this operation, the first holder-side guides 41 and the second holder-side guides 42 of the holder 30 are respectively engaged with the first holder-side guide receiving portions 45 and the second holder-side guide receiving portions 44 of the holder 30 on the left side, thus assisting in locking between the lock portion 40A and the lock receiving portion 43 (see FIGS. 10 and 11). In a state in which the holders 30 are attached to the bracket 50, a clearance CL2 is set between each of the holders 30 and the bracket 50 in the vertical direction as shown in FIG. 7, and a clearance CL3 is set between each of the holders 30 and the bracket 50 in the left-right direction as shown in FIG. 6.

Next, each bus bar 20 is attached to the corresponding holder 30. The upper connection portion 21 is pressed against the holder 30 from above, and comes into contact with the tapered surfaces 37 of the bus bar holding portions 35A and 35B. The upper connection portion 21 slides on the tapered surfaces 37 while bending the bus bar holding portions 35A and 35B outward, and moves over the bus bar holding portions 35A and 35B (see FIG. 6). In a state in which the bus bar 20 is held by the holder 30, the bus bar 20 is located below the lower surfaces 35C of the bus bar holding portions 35A and 35B. At this time, as shown in FIG. 4, the bus bar 20 is positioned relative to the holder 30 such that the protrusions 38 of the holder 30 are fitted to the recesses 24 of the upper connection portion 21. A clearance CL1 is set between the holder 30 and the bus bar 20 in the front-rear direction.

As shown in FIG. 3, finally the cover 60 is placed on the bracket 50 from above, and the projecting portions 67 and the projection receiving portion 59B are locked to each other, whereby the attachment of the connection module 10 is completed.

Mounting of Connection Module to Battery Pack

As shown in FIGS. 1 and 2, the connection module 10 that has been attached in the above-described manner is placed on the terminal block 3 inside the battery pack 1, and the connection module 10 is fixed to the terminal block 3 by locking between the projecting portions 59 of the bracket 50 and projection receiving portions (not shown) of the terminal block 3. Bolts BT3 are inserted into the fixing holes 62 and 57, and nuts N and the bolts BT3 are fastened together, thus further fixing the cover 60 to the bracket 50. Bolts BT1 are inserted into the bolt fastening holes 21A of the upper connection portions 21 and bolt fastening holes (not shown) of the device-side connection portions 4A, and the bolts BT3 are fastened to the bolt fixing portions 3A, whereby the connection module 10 and the device 4 are electrically connected to each other. Bolts BT2 are inserted into the bolt fastening holes 22A of the lower connection portions 22 and bolt fastening holes (not shown) of the connector-side connection portions 7B, and the bolts BT2 are fastened to the bolt fixing portions of the terminal accommodating portion 8, whereby the connection module 10 and the connector 5 are electrically connected to each other. Accordingly, the device 4 and the connector 5 are electrically connected to each other.

Operations and Effects of Embodiment 1

According to Embodiment 1, the following operations and effects are achieved.

The connection module 10 according to Embodiment 1 is a connection module 10 configured to be accommodated inside a battery pack 1 including an upper case 1U and a lower case 1L, the connection module including: a plurality of bus bars 20 that electrically connect a device 4 disposed on the upper case 1U side inside the battery pack 1 to a connector 5 disposed on the lower case 1L side inside the battery pack 1; a plurality of holders 30 that hold the plurality of bus bars 20, each of the plurality of holders 30 including bus bar holding portions 35A and 35B; and a bracket 50 capable of locking the plurality of holders 30, wherein, in a state in which the plurality of holders 30 that hold the plurality of bus bars 20 are locked to the bracket 50, the plurality of bus bars 20 are arranged side by side in a left-right direction orthogonal to a vertical direction, a direction orthogonal to the vertical direction and intersecting the left-right direction is assumed to be a front-rear direction, the plurality of bus bars 20 each include an upper connection portion 21 extending in the front-rear direction so as to be connected to the device 4, a lower connection portion 22 extending in the front-rear direction so as to be connected to the connector 5, and a coupling portion 23 extending in the vertical direction so as to connect the upper connection portion 21 and the lower connection portion 22 to each other, a clearance CL1 is set between each of the bus bars 20 and the corresponding holder in the front-rear direction, and a clearance CL2 and a clearance CL3 are set between each of the holders 30 and the bracket 50 in the vertical direction and the left-right direction, respectively.

With the above-described configuration, the plurality of bus bars 20 electrically connect the device 4 disposed on the upper case 1U side inside the battery pack 1 to the connector 5 disposed on the lower case 1L side inside the battery pack 1. Accordingly, it is possible to complete the manufacturing process of the battery pack 1 by placing the upper case 1U on the lower case 1L so as to seal a gap therebetween after completing electrical connection of all the devices mounted inside the battery pack 1. In addition, the clearance CL1 is set between each of the bus bars 20 and the corresponding holder 30 in the front-rear direction, and the clearance CL2 and the clearance CL3 are set between each of the holders 30 and the bracket 50 in the vertical direction and the left-right direction, respectively. Accordingly, it is possible to absorb positional shift and dimensional variation of the members and mounted devices in each of the directions.

In Embodiment 1, the plurality of holders 30 include an intermediate holder 30M, a right end holder 30R, and a left end holder 30L. In a state in which the plurality of holders 30 are locked to the bracket 50, the holders 30 are disposed on opposite sides of the intermediate holder 30M in the left-right direction. The holders 30 are disposed only on the left side of the right end holder 30R in the left-right direction. The holders 30 are disposed only on the right side of the left end holder 30L in the left-right direction. The intermediate holder 30M includes both a lock portion 40A and a lock receiving portion 43. The right end holder 30R includes the lock portion 40A and the lock receiving portion 43. The left end holder 30L includes only the lock receiving portion 43 out of the lock portion 40A and the lock receiving portion 43. The adjacent holders 30 of the plurality of holders 30 are locked to each other with a clearance CL4 therebetween in the left-right direction by the lock portion 40A of one of the holders 30 and the lock receiving portion 43 of the other holder 30 being locked to each other.

With the above-described configuration, it is possible to couple the adjacent holders 30 to each other, thus facilitating attachment between the holders 30. In addition, the configuration includes the left end holder 30L that does not include the lock portion 40A, and it is therefore possible to reduce the length of the bracket 50 in the left-right direction. Since the plurality of holders 30 are locked to each other with the clearance CL4 therebetween in the left-right direction, it is possible to absorb positional shift and dimensional variation of the members and mounted devices in the left-right direction.

In Embodiment 1, on each of the holders 30, a first holder-side guide 41 and a second holder-side guide 42 are provided in the vicinity of the lock portion 40A, a first holder-side guide receiving portion 45 and a second holder-side guide receiving portion 44 are provided in the vicinity of the lock receiving portion 43, the first holder-side guide 41 and the second holder-side guide 42 protrude outward in the left-right direction, and the first holder-side guide receiving portion 45 and the second holder-side guide receiving portion 44 receive the first holder-side guide 41 and the second holder-side guide 42.

The above-described configuration facilitates attachment between the holders 30.

In Embodiment 1, the bracket 50 is provided with a rail 53 extending in the left-right direction, and each of the holders 30 is provided with a rail-side guide 39 configured to be fitted to the rails 53.

The above-described configuration facilitates attachment of the holders 30 to the bracket 50.

In Embodiment 1, a pair of the rails 53 and a pair of the rail-side guides 39 are provided so as to be spaced apart in the front-rear direction.

With the above-described configuration, it is possible to increase the locking force of the holders 30 provided by the bracket 50. In addition, it is possible to suppress rattling of the holders 30 attached to the bracket 50.

In Embodiment 1, the connection module 10 further includes a cover 60 configured to cover the bus bars 20 and the holders 30 from above and be fixed to the bracket 50.

With the above-described configuration, it is possible to prevent the bus bars 20 and the holders 30 from being detached from the bracket 50.

Embodiment 2

Embodiment 2 of the present disclosure will be described with reference to FIGS. 15 to 17. In the following, descriptions of the members, operations and effects that are the same as those of Embodiment 1 will be omitted. For a plurality of the same members, reference numerals may be assigned to some of the members, and reference numerals may be omitted for the other members.

A connection module 110 according to Embodiment 2 includes a plurality of bus bars 20, a plurality of holders 30 that hold the plurality of bus bars 20, and a bracket 150 configured to be locked to the plurality of holders 30.

Figure 15:
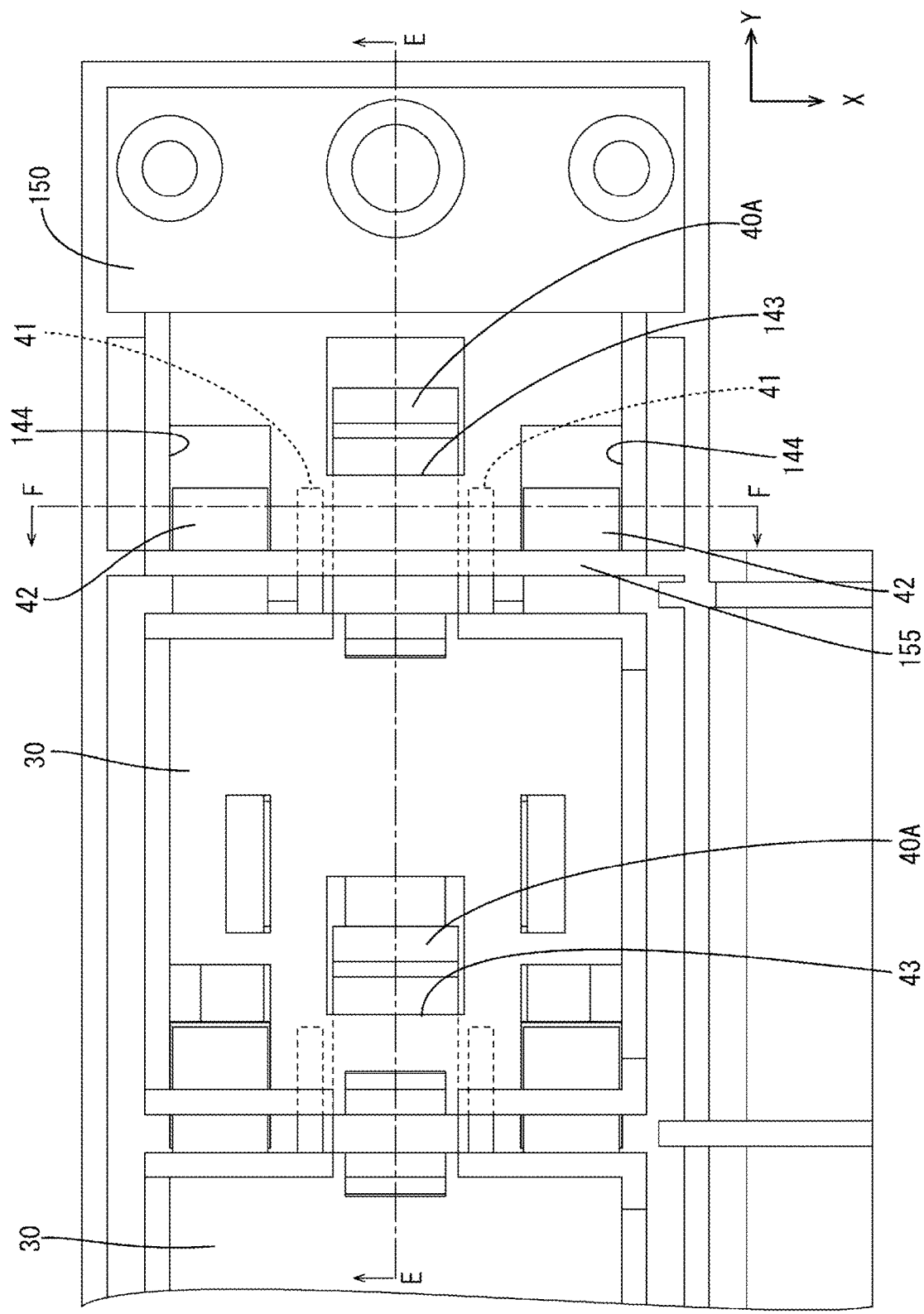
FIG. 15 is a plan view showing locking between a lock receiving portion of a bracket and a lock portion of a holder according to Embodiment 2.
Figure 16:
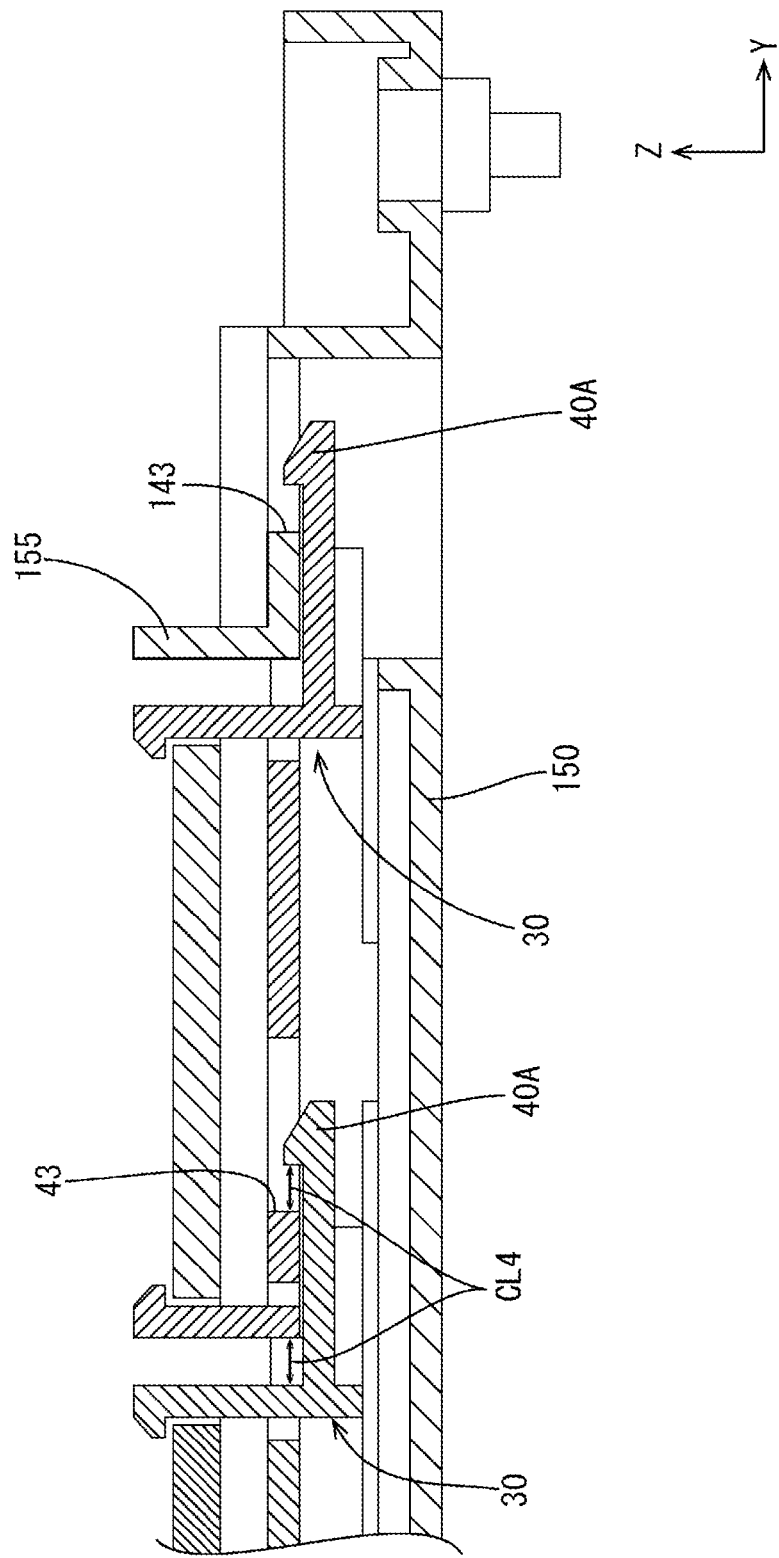
FIG. 16 is a cross-sectional view taken along the line E-E in FIG. 15.

As shown in FIGS. 15 and 16, a stopper portion 155 in the form of an upwardly extending wall surface is provided at the left end of the bracket 150. A lock receiving portion 143 similar to the counterpart of the holder 30 is provided leftward and downward of the stopper portion 155. The lock receiving portion 143 is locked to the lock portion 40A of the holder 30. As shown in FIG. 17, the bracket 150 includes first holder-side guide receiving portions 145 and second holder-side guide receiving portions 144 similar to the counterparts of the holder 30. The first holder-side guide receiving portions 145 and the second holder-side guide receiving portions 144 are respectively engaged with the first holder-side guides 41 and the second holder side guides 42 of the holder 30.

Operations and Effects of Embodiment 2

According to Embodiment 2, the following operations and effects are achieved.

As shown in FIG. 16, each of the plurality of holders 30 includes a lock portion 40A and a lock receiving portion 43, and the adjacent holders 30 of the plurality of holders 30 are locked to each other with a clearance CL4 therebetween in the left-right direction by the lock portion 40A of one holder 30 and the lock receiving portion 43 of the other holder 30 being locked to each other.

With the above-described configuration, the holders 30 each include a lock portion 40A and a lock receiving portion 43, and it is therefore possible to couple the adjacent holders 30 to each other, thus facilitating attachment between the holders 30. In addition, there is no need to separately form the holder 30 that does not include the lock portion 40A, such as the left end holder 30L of Embodiment 1. Since the plurality of holders 30 are locked to each other with the clearance CL4 therebetween in the left-right direction, it is possible to absorb positional shift and dimensional variation of the members and mounted devices in the left-right direction.

Embodiment 3

Embodiment 3 of the present disclosure will be described with reference to FIGS. 18 to 21. In the following, descriptions of the members, operations and effects that are the same as those of Embodiment 1 will be omitted. For a plurality of identical members, reference numerals may be assigned to some of the members, and reference numerals may be omitted for the other members.

A connection module 210 according to Embodiment 3 includes a plurality of bus bars 20, a plurality of holders 30 that hold the plurality of bus bars 20, and a bracket 250 configured to be locked to the plurality of holders 30.

Operations and Effects of Embodiment 3

Figure 18:
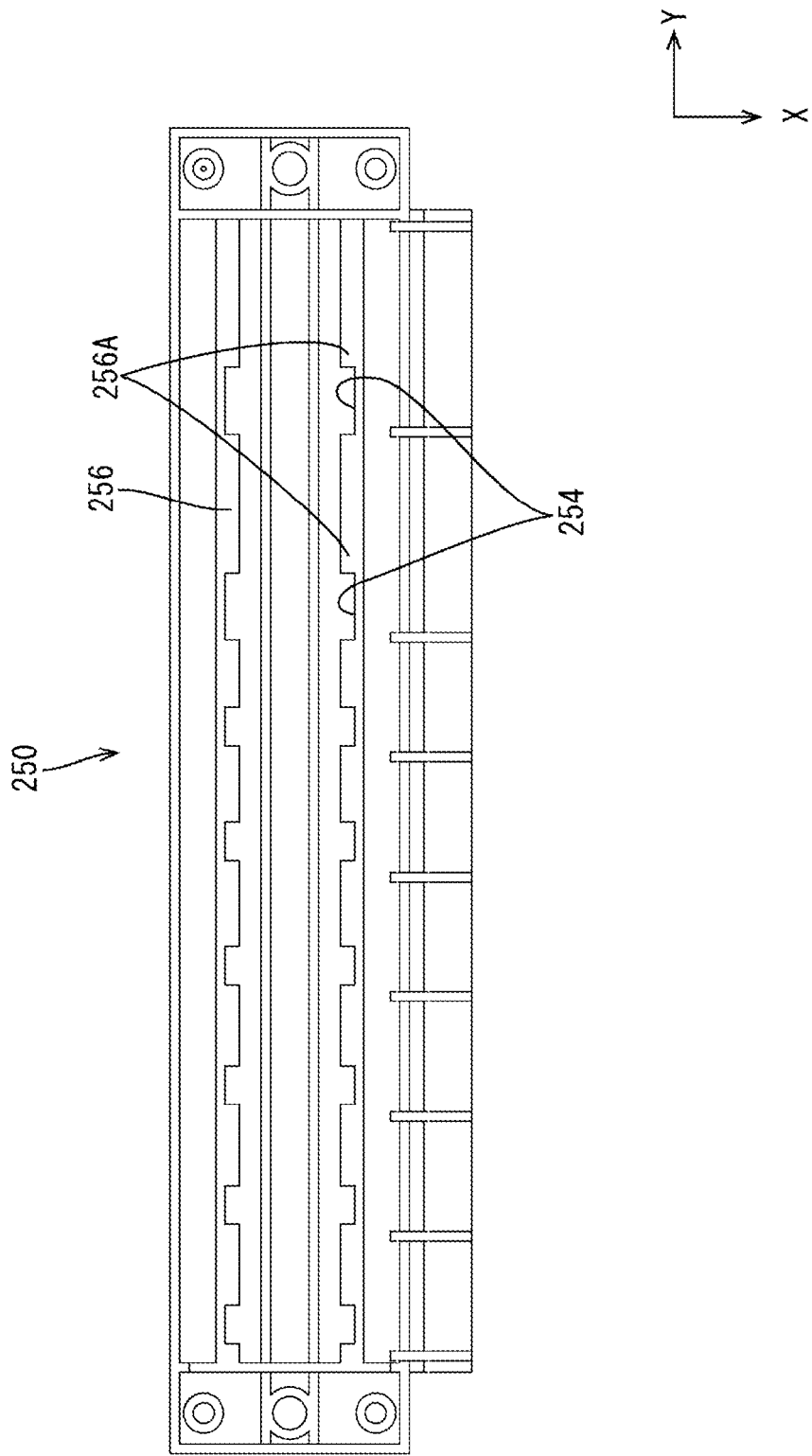
FIG. 18 is a plan view of a bracket according to Embodiment 3.
Figure 20:
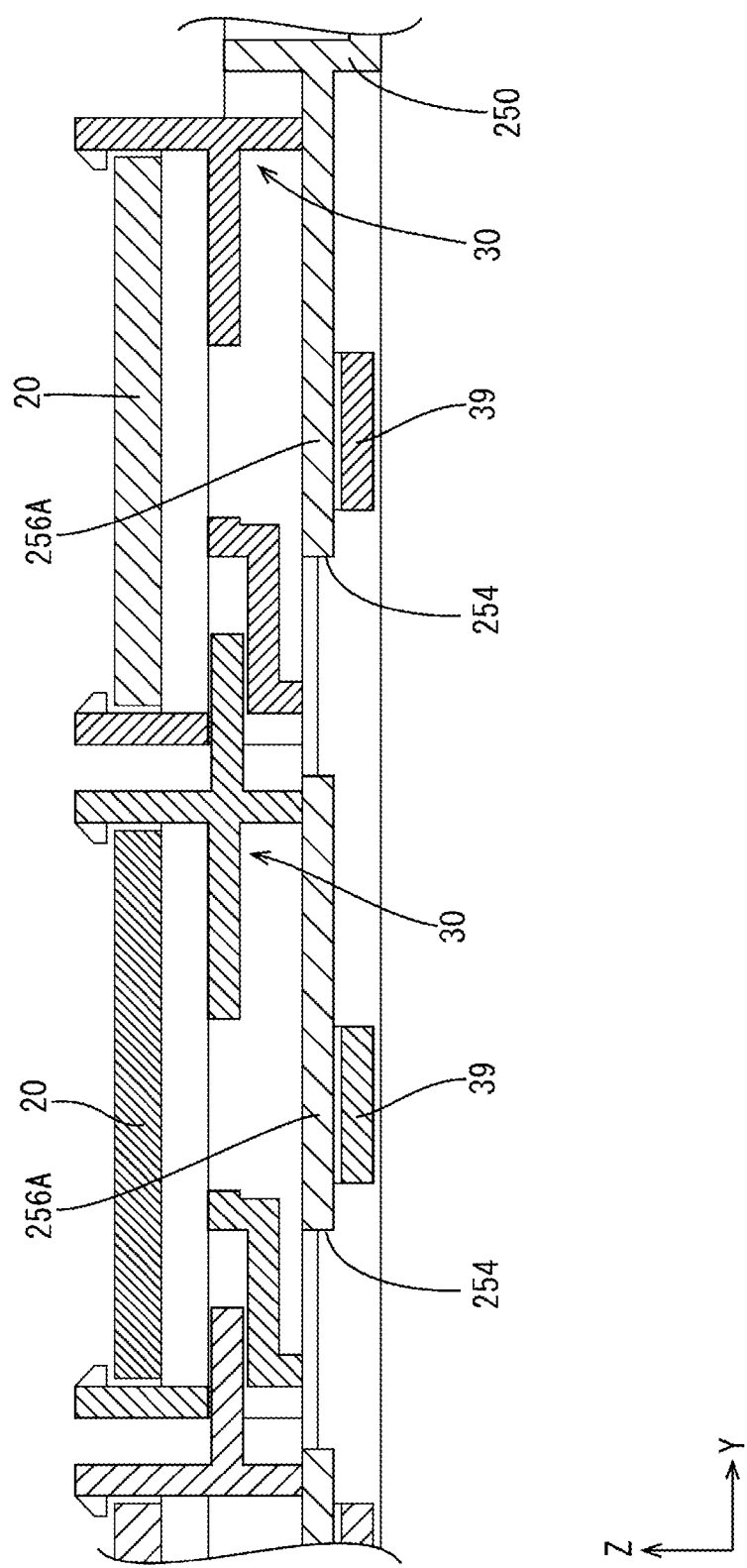
FIG. 20 is a cross-sectional view taken along the line G-G in FIG. 19.
Figure 21:
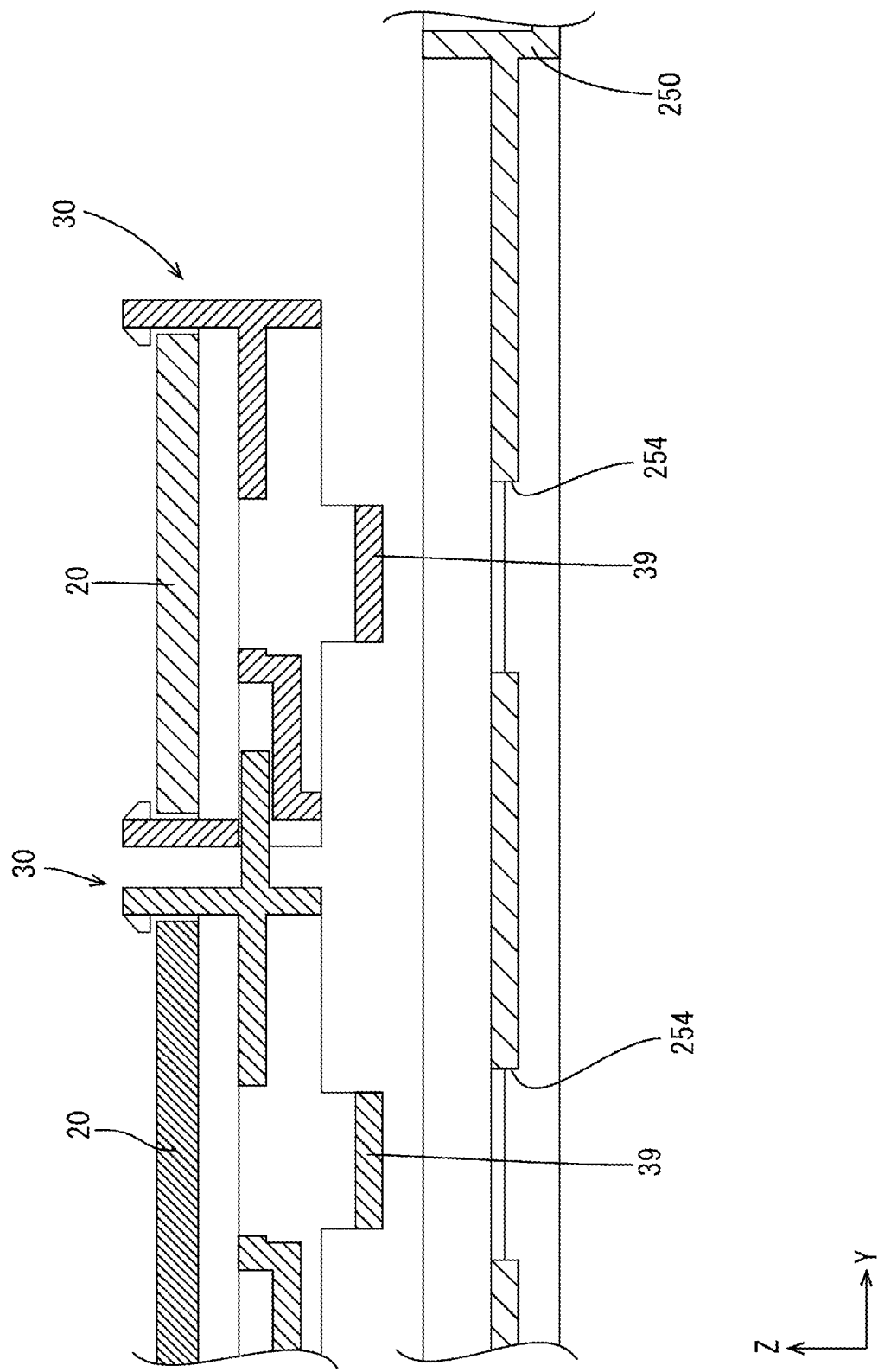
FIG. 21 is a view showing attachment between holders and the bracket in a cross section taken along the line G-G in FIG. 19.

As shown in FIG. 18, a plurality of insertion openings 254 of the bracket 250 are formed in an extension portion 256. As shown in FIG. 20, each of the insertion openings 254 is disposed on the right side of a normal locking position of the corresponding holder 30. As a result of the rail-side guide 39 (an example of an engaging portion) being engaged, from below, with engagement receiving portions 256A of the extension portion 256 that are located leftward of the corresponding insertion openings 254, the holders 30 are held so as to be prevented from being dislodged upward. Accordingly, it is possible to attach a plurality of holders 30 and the bracket 250 to each other by inserting the rail-side guides 39 of each of a plurality of previously coupled holders 30 into the corresponding insertion openings 254 from above, and thereafter moving the plurality of coupled holders 30 leftward as shown in FIG. 21, instead of attaching the holders 30 one by one to the bracket 50 by inserting the rail-side guides 39 of each of the holders 30 from the insertion opening 54 located at the right end of the bracket 50 as in the case of Embodiment 1 (see FIG. 4).

Figure 19:
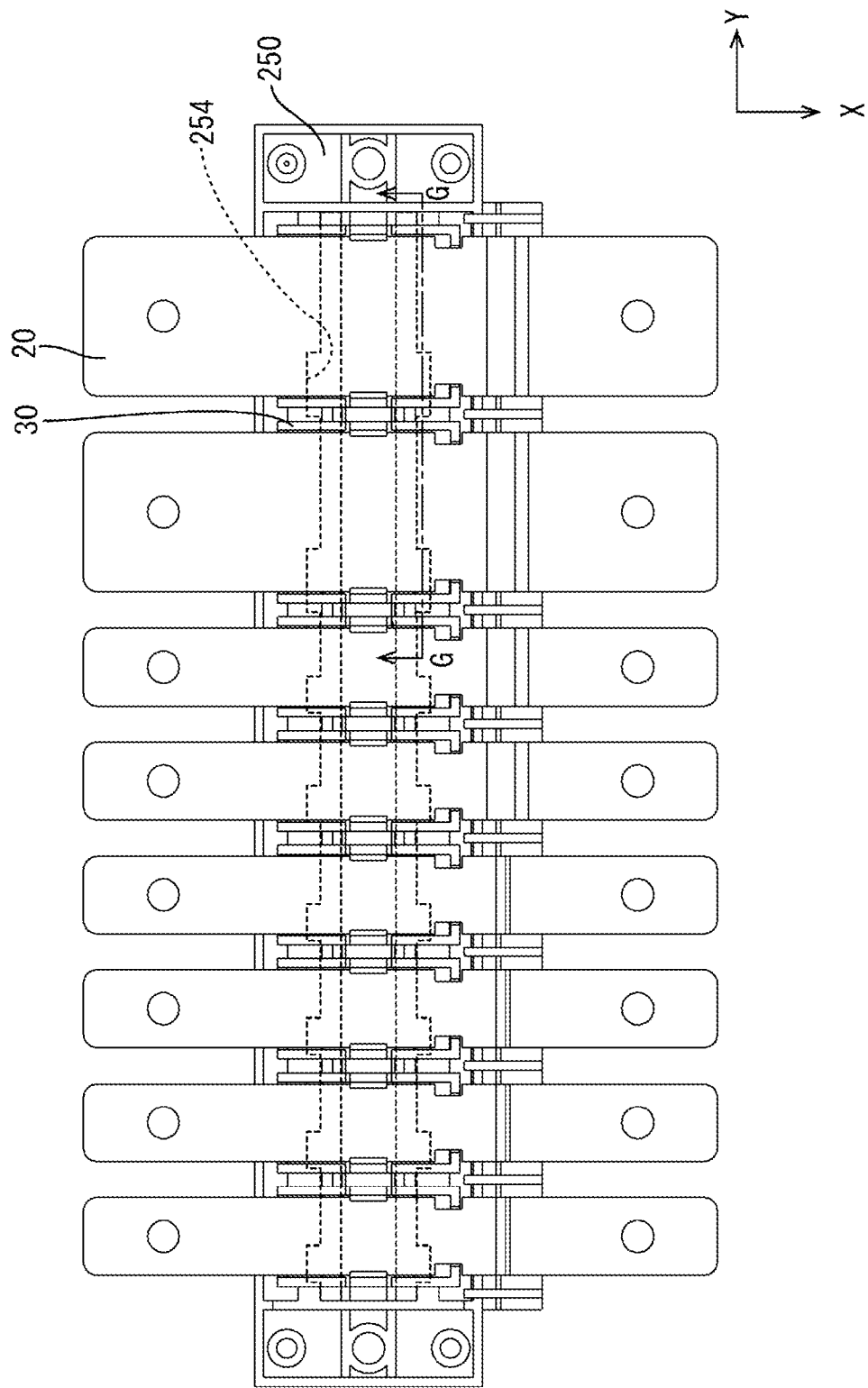
FIG. 19 is a plan view of a connection module before a cover is fixed thereto.

Although the insertion opening 54 is provided at the right end of the bracket 50 (see FIG. 4) in Embodiment 1, the insertion openings 254 of the connection module 210 are provided in the extension portion 256 as shown in FIG. 19. Accordingly, the bracket 250 can be formed smaller than the bracket 50 in the left-right direction.

Other Embodiments (1) Although Embodiments 1 to 3 have described cases where the connection modules 10, 110, and 210 are applied to the battery pack 1, the present disclosure is not limited thereto. The connection modules are also applicable to casings other than a battery pack.

(2) Although Embodiments 1 to 3 use configurations in which the bus bar accommodating portion 52 that accommodates the coupling portions 23 of the bus bars 20 are provided in each of the brackets 50, 150, and 250, the present disclosure is not limited thereto. It is possible to adopt a configuration in which a bus bar accommodating portion for one holder is provided in each of the holders.

3) Although Embodiments 1 to 3 use configurations in which electrical connection between the bus bars 20 and the device 4, and electrical connection between the bus bars 20 and the connector 5 are achieved through bolt fastening, the present disclosure is not limited thereto. It is possible to adopt a configuration in which these electrical connections are achieved through welding, for example.

LIST OF REFERENCE NUMERALS

1: Battery pack
1L: Lower case
1U: Upper case
2: Battery bracket
3: Terminal block
3A: Bolt fixing portion
3C: Nut accommodating portion
3B: Locking piece
59B: Projection receiving portion
3F: Front terminal block
3R: Rear terminal block
4: Device
4A: Device-side connection portion
5: Connector
6: Hood portion
7: Terminal fitting
7A: Tab
7B: Connector-side connection portion
8: Terminal accommodating portion
10, 110, 210: Connection module
20: Bus bar
21: Upper connection portion
22: Lower connection portion 21A, 22A: Bolt fastening hole
23: Coupling portion
24: Recess
30: Holder
30L: Left end holder
30M: Intermediate holder
30R: Right end holder
31A, 31B: Side wall
32: Front wall
32A, 33A: Upper surface
33: Rear wall
34: Bottom wall
35A, 35B: Bus bar holding portion
35C: Lower surface
36: Cut-out portion
37, 40B: Tapered surface
38: Protrusion
39: Rail-side guide (example of engaging portion)
40: Lock piece
40A: Lock portion
41: First holder-side guide
42: Second holder-side guide
43, 143: Lock receiving portion
44, 144: Second holder-side guide receiving portion
45, 145: First holder-side guide receiving portion
50, 150, 250: Bracket
51: Holder base portion
52: Bus bar accommodating portion
53: Rail
53F: Front rail
53B: Rear rail
54, 254: Insertion opening
55, 155: Stopper portion
56, 256: Extension portion
56F: Front extension portion
56B: Rear extension portion
57, 62: Fixing hole
58: Partition plate
59A, 67: Projecting portion
60: Cover
61: Body portion
63: Protection wall
64: Groove portion
65: Retaining portion
66: Fixing portion
256A: Engagement receiving portion
B: Battery cell
BT1, BT2, BT3: Bolt
CL1, CL2, CL3, CL4: Clearance
N: Nut

The invention claimed is:

1. A connection module configured to be accommodated inside a casing including an upper case and a lower case, the connection module comprising:
a plurality of bus bars that electrically connect a device disposed on the upper case side inside the casing to a connector disposed on the lower case side inside the casing;
a plurality of holders that hold the plurality of bus bars, each of the plurality of holders including a bus bar holding portion; and
a bracket capable of locking the plurality of holders,
wherein, in a state in which the plurality of holders that hold the plurality of bus bars are locked to the bracket, the plurality of bus bars are arranged side by side in a first direction orthogonal to a vertical direction, a direction orthogonal to the vertical direction and intersecting the first direction is assumed to be a second direction,
the plurality of bus bars each include an upper connection portion extending in the second direction so as to be connected to the device, a lower connection portion extending in the second direction so as to be connected to the connector, and a coupling portion extending in the vertical direction so as to connect the upper connection portion and the lower connection portion to each other,
a clearance is set between each of the bus bars and the corresponding holder in the second direction, and
clearances are set between each of the holders and the bracket in the vertical direction and the first direction, respectively.

2. The connection module according to claim 1,
wherein each of the plurality of holders includes a lock portion and a lock receiving portion, and
adjacent holders of the plurality of holders are locked to each other with a clearance therebetween in the first direction by the lock portion of one of the holders and the lock receiving portion of another holder being locked to each other.

3. The connection module according to claim 2,
wherein, on each of the holders, a holder-side guide is provided in the vicinity of the lock portion, and a holder-side guide receiving portion is provided in the vicinity of the lock receiving portion,
the holder-side guide protrudes outward in the first direction, and
the holder-side guide receiving portion receives the holder-side guide.

4. The connection module according to claim 1,
wherein the plurality of holders include an intermediate holder and end holders,
in a state in which the plurality of holders are locked to the bracket, the holders are disposed on opposite sides of the intermediate holder in the first direction, and the holders are disposed on only one side of the end holders in the first direction,
the intermediate holder includes both a lock portion and a lock receiving portion,
one of the end holders includes at least a lock portion,
another end holder includes only a lock receiving portion, and
adjacent holders of the plurality of holders are locked to each other with a clearance therebetween in the first direction by a lock portion of one of the holders and a lock receiving portion of another holder being locked to each other.

5. The connection module according to claim 1,
wherein the bracket is provided with a rail extending in the first direction, and
each of the holders is provided with a rail-side guide configured to be fitted to the rail.

6. The connection module according to claim 5,
wherein a plurality of the rails and a plurality of the rail-side guides are provided so as to be spaced apart in the second direction.

7. The connection module according to claim 1,
wherein each of the plurality of holders is provided with an engaging portion that protrudes downward, and
an engagement receiving portion with which the engaging portion engages from below is formed in the bracket.

8. The connection module according to claim 1, further comprising a cover configured to cover the bus bars and the holders from above and be fixed to the bracket.

* * * * *